Nov. 25, 1958　　　T. R. JAMES　　　2,861,700
REMOTE CONTROL HANDLING UNIT
Filed Aug. 25, 1951　　　　　　　　　　　11 Sheets-Sheet 1

INVENTOR
THOMAS R. JAMES
BY William C. Babcock　ATTORNEY

Nov. 25, 1958 T. R. JAMES 2,861,700
REMOTE CONTROL HANDLING UNIT
Filed Aug. 25, 1951 11 Sheets-Sheet 2
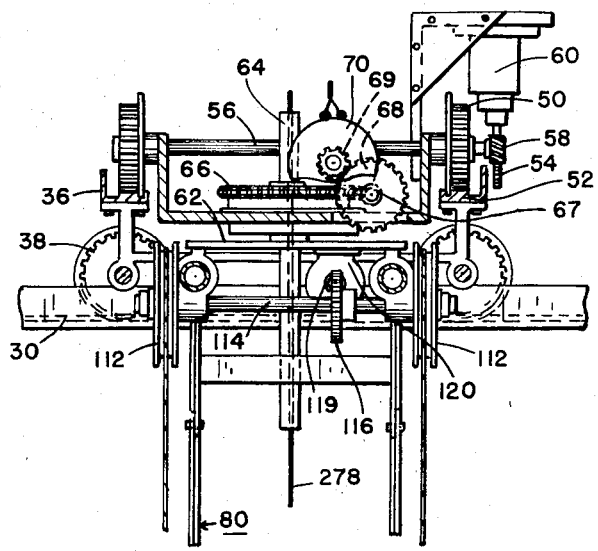
FIG. 2
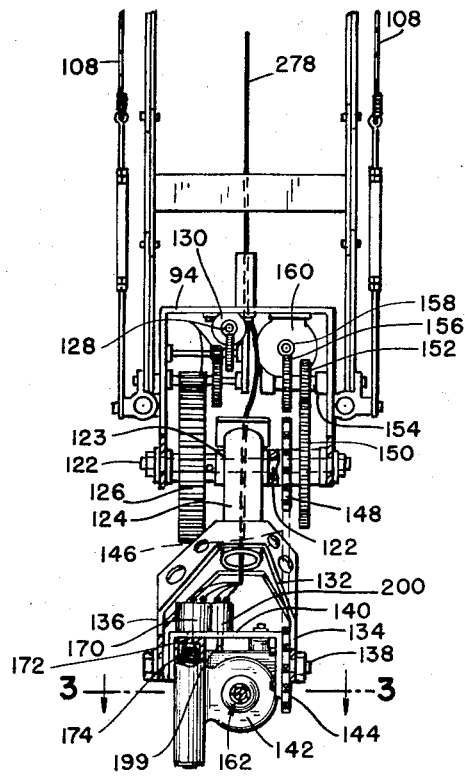
INVENTOR
THOMAS R. JAMES
BY William C. Babcock ATTORNEY Nov. 25, 1958     T. R. JAMES     2,861,700
REMOTE CONTROL HANDLING UNIT
Filed Aug. 25, 1951     11 Sheets-Sheet 3
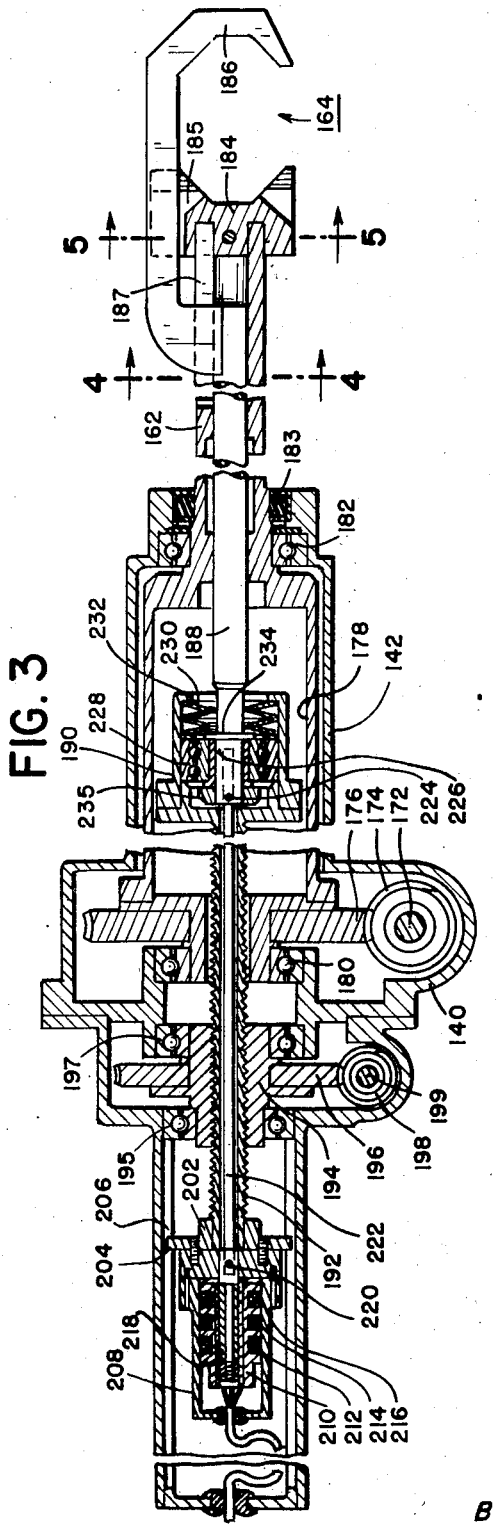
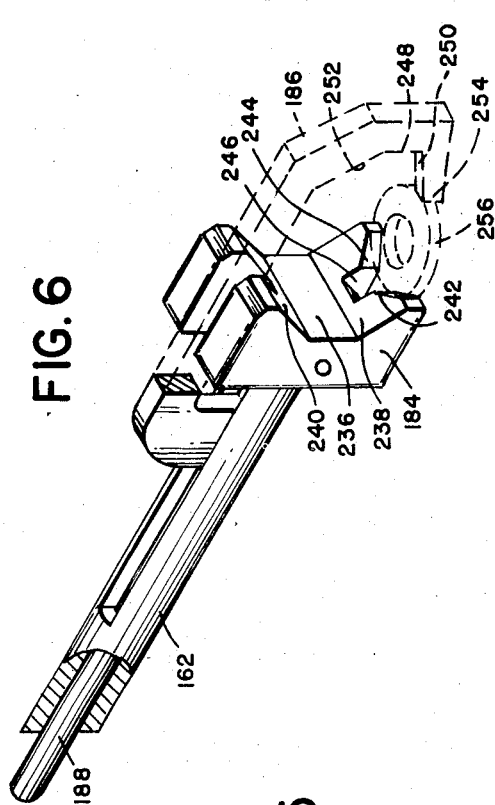
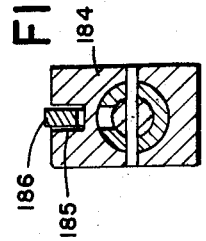
INVENTOR
THOMAS R. JAMES
BY *William C. Babcock* ATTORNEY Nov. 25, 1958
T. R. JAMES
2,861,700
REMOTE CONTROL HANDLING UNIT
Filed Aug. 25, 1951
11 Sheets-Sheet 4
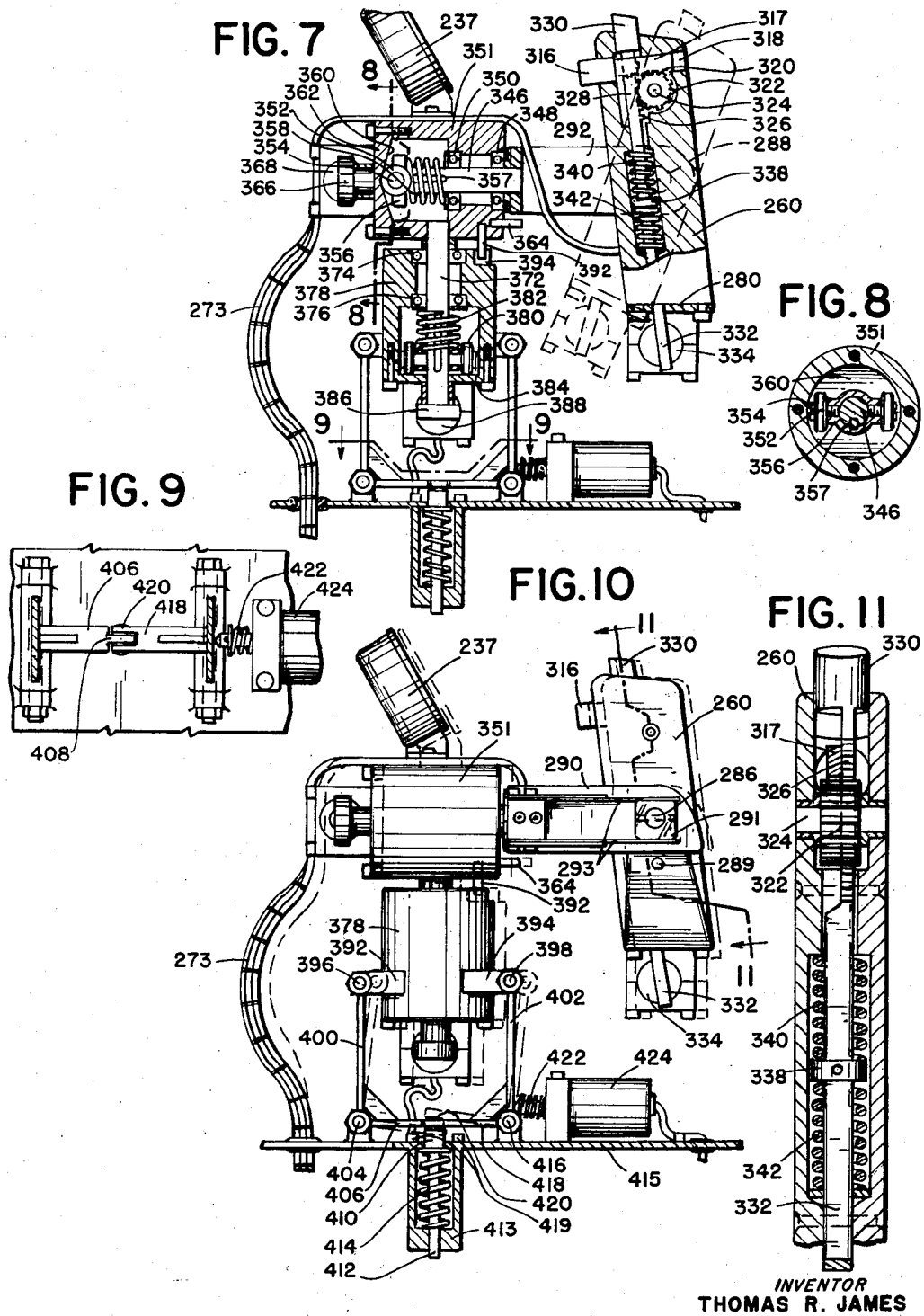
INVENTOR
THOMAS R. JAMES
BY William C. Babcock ATTORNEY Nov. 25, 1958 T. R. JAMES 2,861,700
REMOTE CONTROL HANDLING UNIT
Filed Aug. 25, 1951 11 Sheets-Sheet 5

INVENTOR
THOMAS R. JAMES
BY William C. Babcock ATTORNEY

Nov. 25, 1958
T. R. JAMES
2,861,700
REMOTE CONTROL HANDLING UNIT
Filed Aug. 25, 1951
11 Sheets-Sheet 7
FIG. 16
FIG. 17
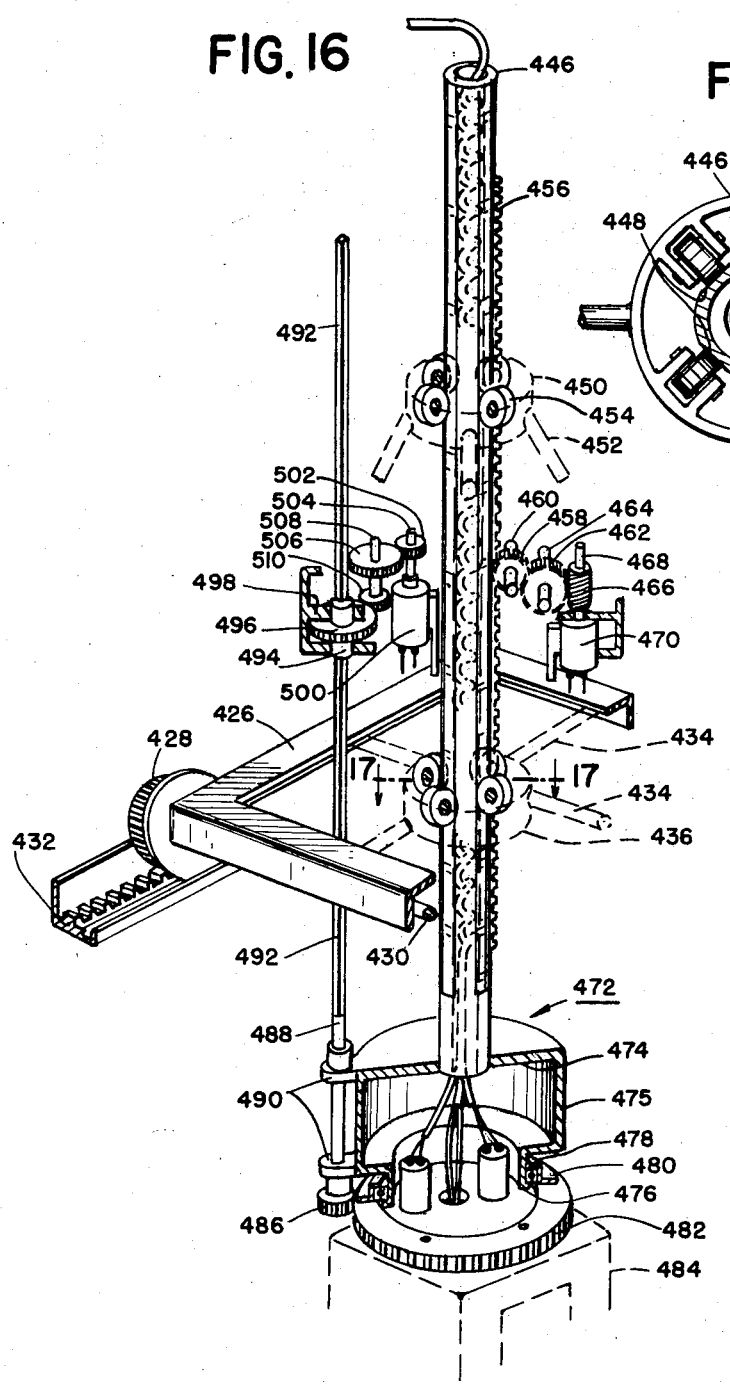
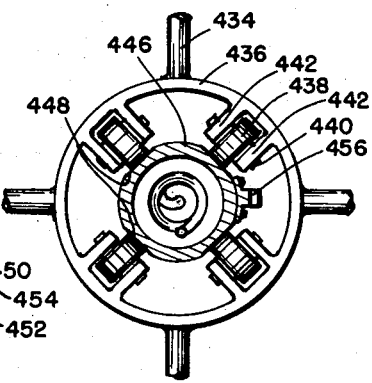
INVENTOR
THOMAS R. JAMES

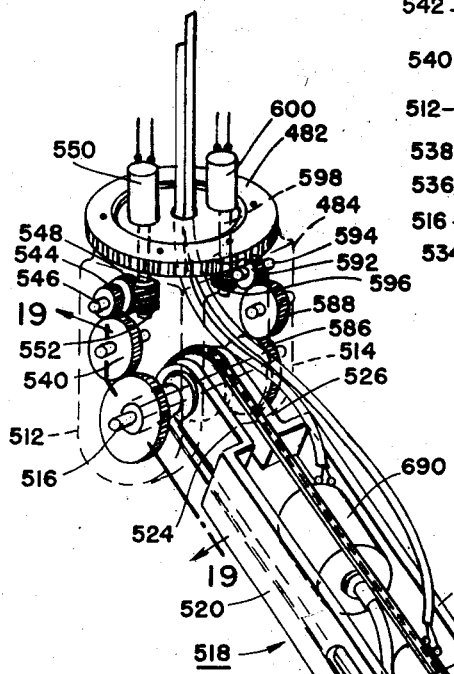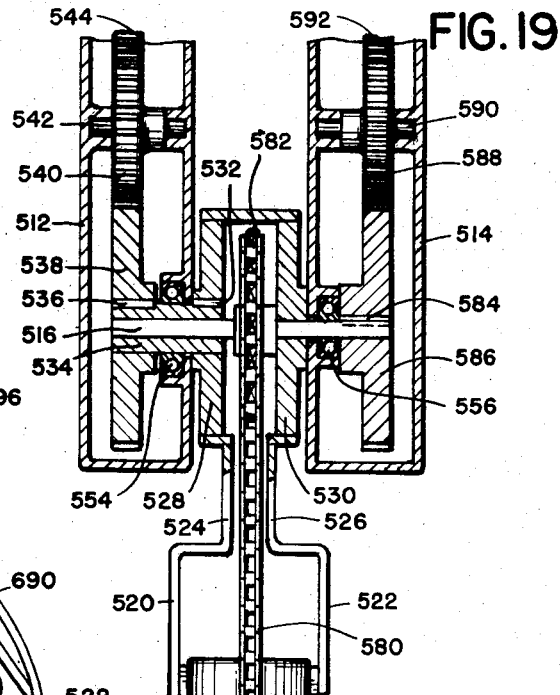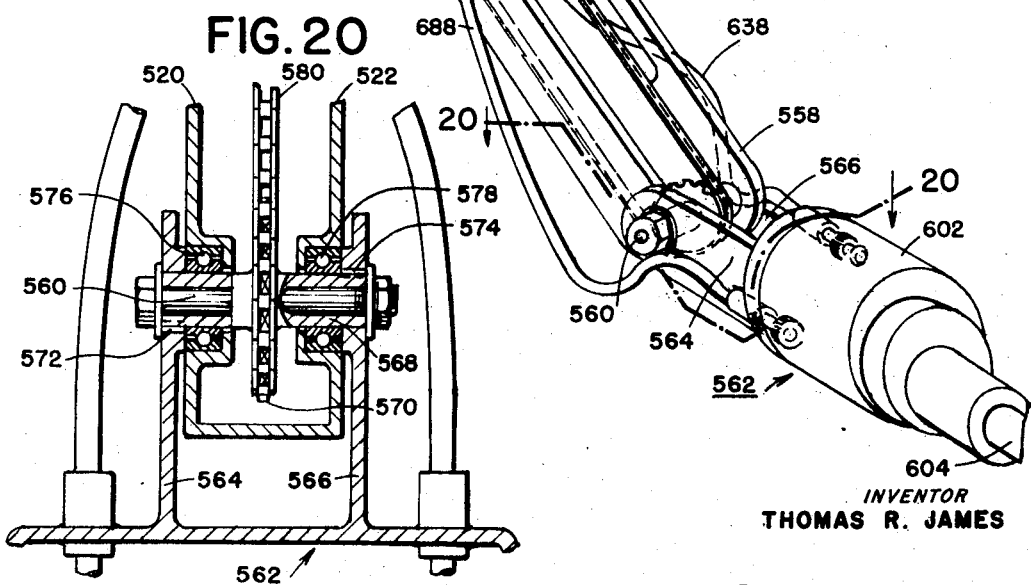

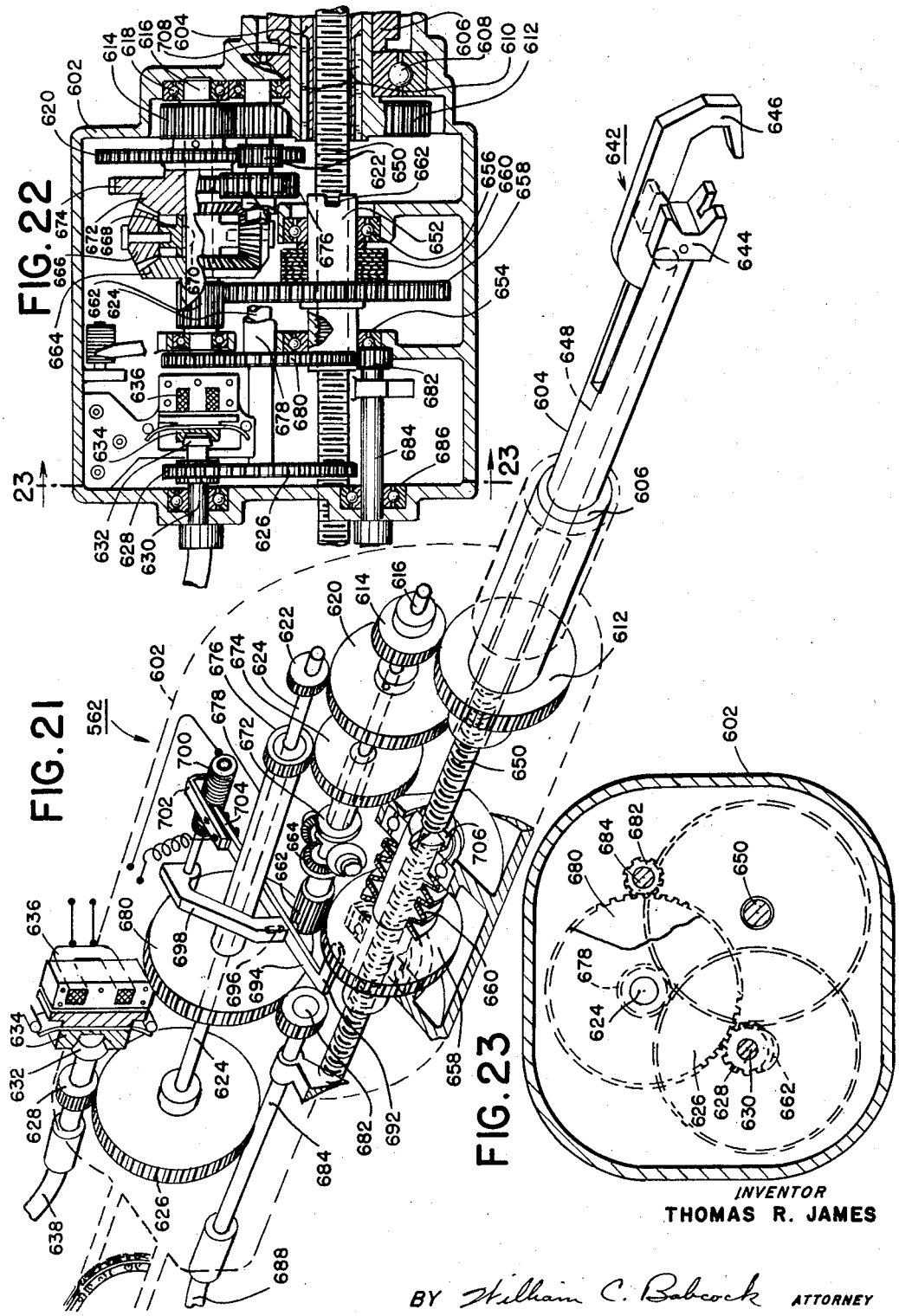

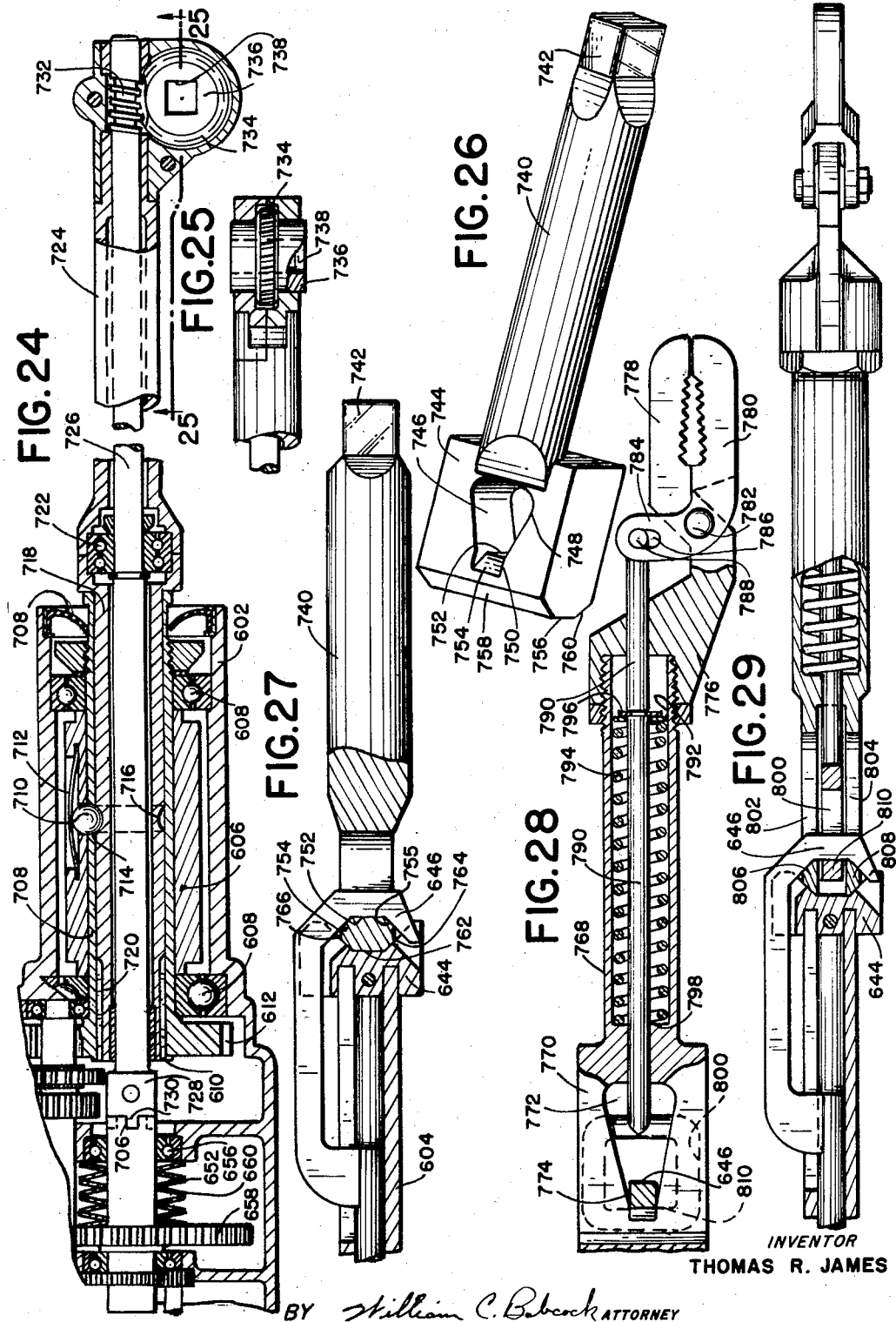

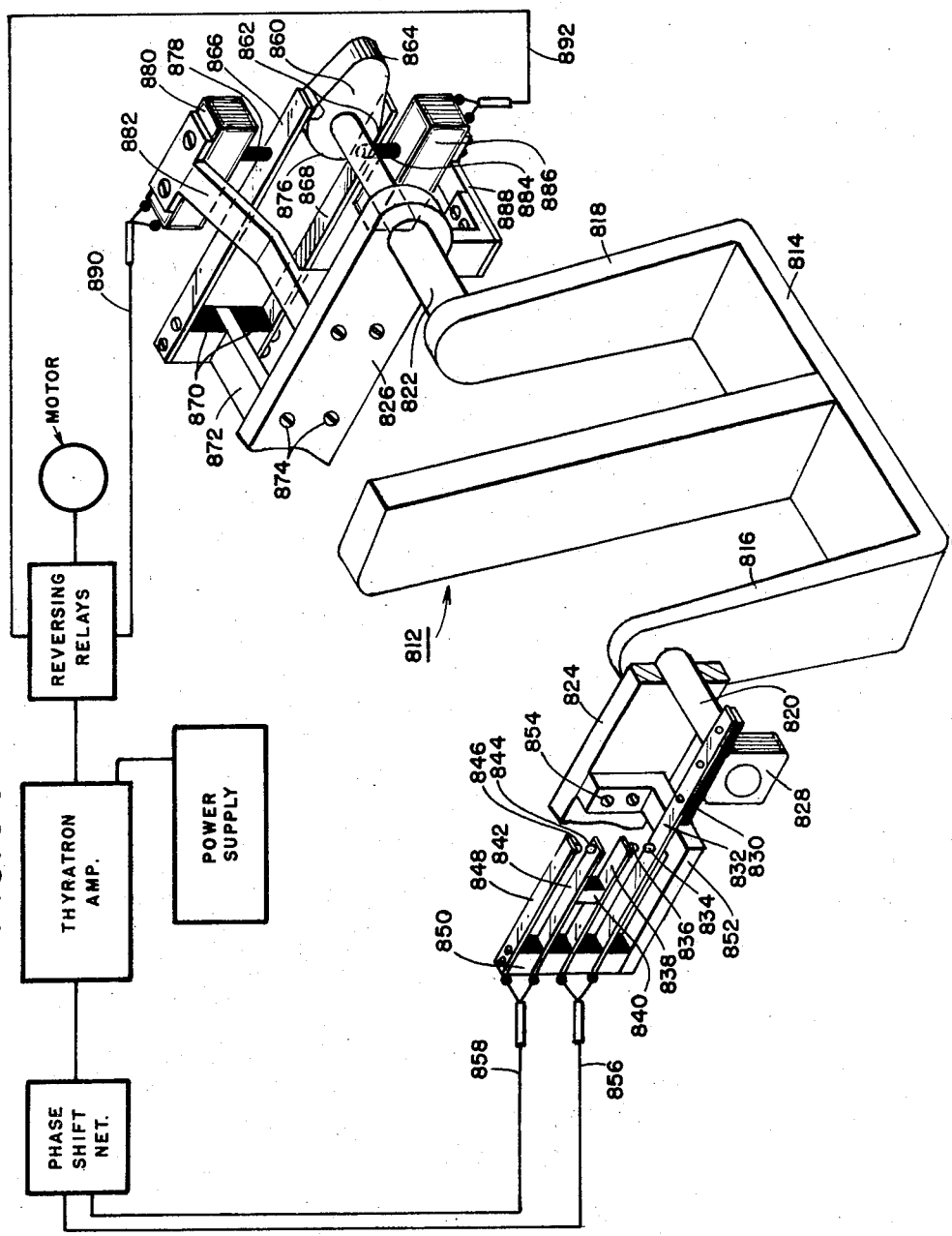

United States Patent Office 2,861,700
Patented Nov. 25, 1958

2,861,700

REMOTE CONTROL HANDLING UNIT

Thomas R. James, Minneapolis, Minn., assignor to General Mills, Inc., a corporation of Delaware Application August 25, 1951, Serial No. 243,705

37 Claims. (Cl. 214—1)

The present invention relates to material handling units and particularly to units capable of operations which simulate certain movements of the human body, such as the shoulder, upper arm, forearm, wrist, and grip, and which are capable of remote control.

Many devices have been proposed in the past for the transmission of desired movements from a control member at one location to a material handling unit in another location. Attempts have also been made to provide material handling units in which movements of the human body, particularly the shoulder and arms, can be simulated. The present invention is concerned with improvements in devices of this type.

One object of the present invention is to provide a material handling unit capable of a wide range of movements and operations.

A further object is the provision of such a unit with improved control means for operation from a remote point.

Still another object is the provision of a material handling unit in which a vertically movable shoulder portion is carried on a carriage or trolley for movement to any desired point within a horizontal plane.

A further object is the provision of such a device in which a vertically movable shoulder unit carries upper arm, lower arm, wrist and grip portions which are movable in a manner simulating movement of the corresponding parts of a human body.

Another object is the provision of a remote handling unit in which separate motor means are provided for the different desired movements and operations and in which a single control member is operatively connected to control a plurality of such motor means.

A further object is the provision of an improved control mechanism for operation of a material handling unit at a remote point. Still another object is the provision of such a control unit in which a relatively large number of different individual operations or movements may be controlled from a single operating handle.

A further object is the provision of a control unit for a remote handling mechanism in which a relatively large number of movements and operations can be conveniently controlled by not more than two control handles, one for each hand of an operator, with the different movements controlled by each handle being grouped in a novel and efficient manner which minimizes the instructions necessary for the training of a new operator.

A further object is the provision of a material handling unit in which the movements of one portion of the mechanism are controlled by motor means mounted on another portion of the unit.

A still further object is the provision of a material handling arm in which movable wrist and gripping members are both included and in which novel mechanism is provided for independent and/or simultaneous operation and adjustment of the wrist and grip movements.

Another object is a handling unit having different attachments for particular operations.

Other objects and advantages of the invention will be apparent from the following specification in which a detailed description of certain preferred embodiments of the invention is given.

In the drawings which accompany this application, and in which like reference characters indicate like parts, Figure 1 is a perspective schematic view of one form of material handling unit and remote control mechanism embodying features of the present invention.

Fig. 2 is a sectional view on the line 2—2 of Fig. 1.

Fig. 3 is a detailed sectional view of the forearm including the wrist and gripping mechanism, taken on the line 3—3 of Fig. 2.

Fig. 4 is a sectional view on the line 4—4 of Fig. 3.

Fig. 5 is a sectional view on the line 5—5 of Fig. 3.

Fig. 6 is a partial perspective view of the gripping mechanism of Fig. 3.

Fig. 7 is a detailed side view with certain portions broken away and other portions shown in section, of the control handle unit of Fig. 1.

Fig. 8 is a sectional view on the line 8—8 of Fig. 7.

Fig. 9 is a sectional view on the line 9—9 of Fig. 7.

Fig. 10 is a side view of the device of Fig. 7 illustrating another of its controlling movements.

Fig. 11 is a sectional view on the line 11—11 of Fig. 10 showing details of the control handle and grip-controlling mechanism.

Fig. 16 is a partial perspective view of the upper portion of an alternate embodiment of the material handling unit.

Fig. 17 is a sectional view on the line 17—17 of Fig. 16.

Fig. 18 is a perspective schematic view of the shoulder, upper arm, and forearm portion of the device of Fig. 16.

Fig. 19 is an enlarged sectional view on the line 19—19 of Fig. 18.

Fig. 20 is an enlarged sectional view on the line 20—20 of Fig. 18.

Fig. 21 is a partial perspective view of the forearm, wrist, and grip portion of the device of Fig. 16 showing schematically the details of operation of the wrist and grip members, with the grip member in open position.

Fig. 22 is a detailed top view of the device of Fig. 21 with the parts in grip-closing position and with certain portions broken away and other portions shown in section for clearness.

Fig. 23 is a sectional view on the line 23—23 of Fig. 22.

Fig. 24 is a partial sectional view of the device of Figs. 21–23, with a different wrist member and accessory substituted for the standard wrist and grip.

Fig. 25 is a sectional view on the line 25-25 of Fig. 24.

Fig. 26 is a perspective view of a supplemental accessory for use with the standard grip member of Fig. 22.

Fig. 27 is an enlarged partial side view, with certain parts shown in section and certain parts broken away, showing the accesory of Fig. 26 in operating position at the end of the grip member.

Fig. 28 is a top view of a plier attachment for use with the standard grip member of Fig. 22, certain portions of the figure being broken away and other portions shown in section for clearness.

Fig. 29 is a side view of the device of Fig. 28 with certain portions broken away and other portions shown in section, and Fig. 30 is an enlarged partial perspective and schematic view showing details of an alternate control unit for one of the material handling motors.

In general, the apparatus which is provided to carry out the present invention includes a control unit located at a point remote from the material handling unit and connected electrically, but not mechanically, thereto. The material handling unit includes a vertically movable shoulder portion which can be raised or lowered, and moved in any direction horizontally within the limits of the supporting framework of the mechanism. The shoulder unit is also rotatable on a vertical axis. Connected to the shoulder unit is an upper arm portion which is rotatable on a horizontal axis passing through the shoulder portion. At the lower end of the upper arm a lower arm or forearm member is pivoted on an axis parallel to the axis of rotation of the upper arm. This forearm includes a wrist portion rotatable about an axis extending longitudinally of the forearm, i. e., perpendicularly to the pivotal axis by which the forearm is attached to the upper arm. The wrist member includes a grip which has relatively movable portions for engagement with the desired object or load.

From this general description, it will be apparent that the particular embodiment to be described below has portions movable in at least eight different paths. Movement in one direction or the other along these paths is controlled by an operating unit having at least one handle which is movable in a manner simulating the particular movement of the apparatus which is to be controlled. The details by which such construction and operation are achieved will now be described with particular reference to the first embodiment of the invention.

*Figs. 1 through 15*

Figure 1:
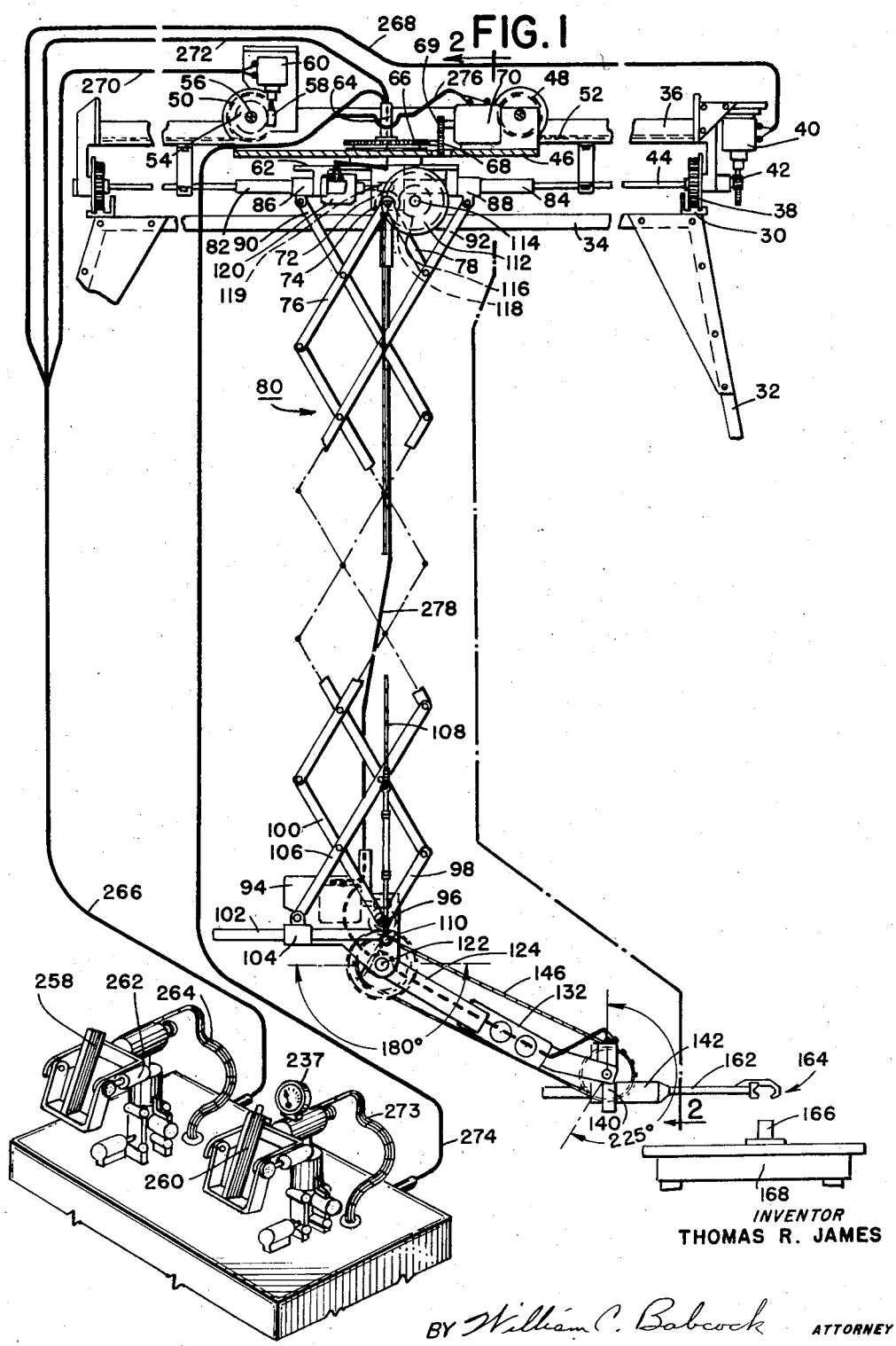

In the embodiment of the invention shown in Figures 1 through 15, inclusive, a mechanism is illustrated which is designed for operation on an overhead trackway 30 (Fig. 1). This trackway 30 may be mounted on suitable building walls, or may be supported by a framework, illustrated, for example, by the vertical supporting legs 32 and the cross members 34.

A travelling bridge 36 is designed for movement back and forth along a predetermined path on the trackway 30. For this purpose the travelling bridge 36 has toothed supporting wheels 38 meshing with suitable rack teeth on the trackway 30 in known manner. The toothed supporting wheels 38 are driven by a motor 40 through suitable gearing 42 which drives the shaft 44 on which the supporting wheels 38 are keyed. The motor 40 is hereinafter referred to as the bridge motor since it is utilized to obtain movement of the bridge along the trackway 30.

The travelling bridge 36 carries a movable carriage or trolley 46 provided with toothed supporting wheels 48 and 50 which engage a pair of toothed supporting racks 52 forming a trackway at right angles to the trackway 30. A suitable gear 54 on the shaft 56 of carriage-supporting wheel 50 is engaged by a worm 58 on the shaft of a motor 60, generally referred to as the carriage motor. This carriage motor provides means for controlled movement of the carriage 46 back and forth on the trackway 52 of the travelling bridge 36. Thus the bridge motor 40 provides for movement of the bridge in one direction, while the carriage motor 60 provides for back-and-forth movement of the carriage at right angles to the direction of movement of the bridge. By suitable coordination of the operation of these two motors it is obviously possible to move the carriage 46 to any desired location in its horizontal plane, within the limits of movement of the trackways 30 and 52.

A member 62 is mounted on the carriage or trolley 46 for rotation on a vertical axis centered on shaft 64. Shaft 64 carries a gear member 66 driven by a worm 67 (Fig. 2) on an intermediate shaft. Another gear 68 on this intermediate shaft is driven by suitable gearing 69 on the shaft of motor 70. Operation of the shaft of motor 70 in one direction or the other will accordingly cause rotation of the member 62 in a horizontal plane around the vertical axis of shaft 64. For convenience motor 70 is referred to herein as the horizontal rotation motor.

The rotatably mounted member 62 is provided with depending flanges 72 at opposite sides. Pivoted to these flanges at 74 are two members 76 and 78 of a pantograph mechanism indicated generally at 80. As shown in Fig. 2 the pantograph mechanism is duplicated at each side of the member 62, but for convenience only the members on one side are described.

The rotatable member 62 is also provided with horizontal guides 82 and 84 on which collars 86 and 88 are mounted for reciprocation. Pivoted to collar 86 is another member 90 of the pantograph mechanism, while still another pantograph member 92 is pivoted to the sliding collar 88. Members 90 and 92 in turn are pivotally connected to the first mentioned pantograph members 76 and 78 as shown in Fig. 1.

Suitable intermediate pantograph members are similarly linked, and the lower end of the pantograph mechanism 80 is attached to a lower supporting member or shoulder 94. Thus this lower supporting member 94 is provided with a pivotal support 96 for two of the end pantograph members 98 and 100. The lower support member 94 is also provided with a horizontal shaft 102 substantially parallel to the shafts 82, 84 of the upper member 62. A sliding collar 104 on this shaft 102 is pivotally connected to one of the remaining lower pantograph members 106. The lower shoulder member 94 is raised and lowered with respect to the upper supporting member 62 by means of cables 108 fixed at 110 to the member 94. The upper ends of cables 108 are secured to hoisting drums 112 on a horizontal shaft 114 on the upper supporting member 62. A gear 116 keyed to this shaft 114 is driven by an intermediate gear 118, which in turn is driven by a worm 119 on the shaft of motor 120. Since motor 120 raises and lowers the shoulder or supporting member 94 and all the mechanism attached thereto, this motor, which is mounted on the horizontally rotating upper supporting member 62, is referred to as the vertical lift motor.

The lower supporting member 94 is provided with horizontal trunnions for a shaft 122. Keyed to this horizontal shaft 122 is a first load-handling member which, by analogy to the human frame, is referred to as an upper arm member. This upper arm member 124 is accordingly mounted on the lower supporting member or shoulder member 94 by a pivotal connection which permits the upper arm 124 to be raised or lowered around the shaft 122. As indicated in Fig. 1 this upper arm movement may extend for substantially 180°, i. e., from a horizontal position in one direction to a horizontal position in the opposite direction by virtue of the location of the shaft 122 below the main body portion of the member 94.

The movement of this upper arm portion 124 is controlled by a gear 126 which is also keyed to shaft 122 and which is driven through suitable intermediate gearing 128 by means of a motor 130 mounted on the supporting member 94. Motor 130 is reversible (as are the other motors in the unit) and, by means of the reduction gearing, can produce a powerful action of the upper arm 124 in either direction of rotation around the shaft 122.

The lower or free end of the upper arm 124 is bifurcated at 132 to provide opposed supports 134 and 136 (Fig. 2) for a horizontal cross shaft 138. Pivotally mounted on this cross shaft 138 for rotation on its horizontal axis, is the frame member 140 of a lower arm member 142 referred to herein as the forearm. Rigidly connected to this forearm frame member 140 is a gear 144 which is also rotatable on the shaft 138. A chain 146 connects gear 144 with a driving gear 148 which is loosely mounted for free rotation on the horizontal shaft 122 which serves as a pivotal point for the upper arm. A gear 150, which is rigidly connected to the sprocket 148 and is also loosely rotatable on shaft 122, is driven by a gear 152 on an intermediate drive shaft 154. This intermediate drive shaft 154 carries a gear member 156 which is keyed to it and which is driven by the worm 158 on the shaft of a motor 160. Motor 160, which is also mounted on the lower supporting or shoulder member 94, is referred to herein as the forearm motor. Through its operation, movement of the forearm 142 may be obtained in either direction around the shaft 138 through a total arc of substantially 225° as indicated in Fig. 1. The relatively large extent of this forearm movement is made possible by the bifurcated construction at the lower end of the upper arm and by the particular arrangement and mounting of the remaining parts.

Mounted in the forearm member 142 and extending coaxially from it is a wrist portion or member 162. This wrist portion 162 is mounted for rotation on its own axis to simulate the rotation of the wrist of an individual. At the outer end of this wrist portion 162 a suitable gripping mechanism 164 is provided for engagement with loads of various types such as that indicated generally at 166 on the table 168 of Fig. 1. A motor 170 is provided for rotation of the wrist member 162 through suitable intermediate connections. In the embodiment shown in the figures presently described, this motor 170 is mounted on the upper side of the forearm frame member 140. This motor is referred to as the wrist rotation motor and its shaft 172 carries a worm 174 (Fig. 3) located internally of the body portion 142. This worm 172 drives a gear 176 which is rigidly connected to one end of the wrist member 162 and thereby rotates the latter. As shown in Fig. 3, this wrist portion 162 includes an enlarged inner sleeve section 178 located within the forearm 142 and rotatable coaxially with respect thereto. A suitable bearing 180 at the inner end of this sleeve adjacent the gear 176, and an additional bearing 182 at the outer end of the forearm provide for free rotation of the wrist portions 162 and 178 around the longitudinal axis of the forearm. Rotation of the motor shaft 172 through the worm 174 and gear 176 will accordingly rotate both the sleeve portion 178 and the projecting wrist portion 162 in either direction depending upon the direction of rotation of the motor shaft.

A suitable gasket or sealing member 183 is provided at the outer end of the forearm 142 between the forearm and wrist portion 162. This gasket member 183 provides a suitable oil and dust seal to protect the internal operating parts of the mechanism.

The grip member 164 secured to the outer end of the wrist portion 162 includes at least two portions which are relatively movable with respect to each other. In this case, the inner grip portion 184 is rigidly fixed to the wrist member 162.

The grip 164 also has a movable gripping member 186 which slides longitudinally in slots 185 and 187 in the fixed gripping member 184 and wrist portion 162, respectively. The arrangement of these slots prevents relative rotation of the movable gripping member 186 and its associated parts with respect to the wrist member 162 and fixed gripping member 184, but permits relative longitudinal sliding movement so that member 186 may approach the grip portion 184 or recede from it. A central shaft 188 extends through the wrist portion 162 and part of the sleeve portion 178 and is rigidly connected to the movable gripping portion 186 to control this gripping action.

Axial movement of the rod portion 188 and grip member 186 is obtained through a pair of cooperating threaded members connected to the grip and forearm, respectively. Thus the inner end of rod 188 is secured to an internal connecting shell 190 through means described below. This connecting shell 190 is rigidly connected to one of the threaded members, illustrated as an externally threaded hollow shaft portion 192 which extends axially back through the wrist sleeve 178 and the remainder of the forearm housing. An internally threaded nut 194 serves as the second cooperating threaded member and is supported in bearings 195 and 197 in the forearm housing portion 140. This nut 194 is in threaded engagement with the shaft portion 192. Rotation of the nut 194 accordingly reciprocates the shaft portion 192 longitudinally of the forearm and through the connections at 190 reciprocates the rod 188 and movable grip portion 186.

Rotation of the nut 194 is obtained through a gear 196 which is rigidly connected to it and which is driven by a worm 198 on the shaft 199 of a motor 200. Motor 200, referred to as the grip motor, is also mounted on the forearm frame portion 140. Rotation of the shaft of motor 200 in one direction or the other accordingly causes rotation of the nut, longitudinal or axial reciprocation of the threaded shaft 192, and resulting opening or closing movement of the grip member 186 with respect to the fixed grip member 184.

The end of the threaded member 192 which is farthest from the grip portion is rigidly connected to a supporting plate 202 which has projections 204 sliding longitudinally in keyways 206. Thus the cooperating portions 204 and 206 prevent relative rotation of the supporting plate 202 and the threaded shaft 192 with respect to the stationary casing portions of the forearm, while at the same time these interengaging parts permit axial movement of the threaded member and plate 202 under the influence of the adjusting screw 194.

Secured to the axially slidable plate 202 is the housing 208 of a linear differential transformer 210. Transformers of this type may include axially spaced coils 212, 214, and 216 and an axially movable core member 218. The outer coils 212 and 216 are connected in circuit with each other in known manner and with an A. C. supply source. The central coil 214 serves as the secondary coil of the transformer and its output, amplitude, and phase depend upon the relative axial position of the core member 218. Thus when the core member is centered, the output of coil 214 is at a minimum. As the core 218 shifts in either direction, the amplitude of the output gradually increases. The phase, however, depends on the particular direction of movement of the core in a manner well understood in the electrical engineering art.

In this case, the core 218 is connected at 220 to one end of the internal rod 222 which extends through the hollow threaded member 192. The other end of this internal rod 222 is connected at 224 to the grip rod 188. The inner end of this grip rod 188 carries a bushing 226 on which a rotary bearing 228 is mounted. The outer portion of bearing 228 is non-rotatably connected to the shell 190 of the connecting linkage between the rod 188 and the threaded shaft 192. This bearing portion 228 and shell portion 190 are movable axially with respect to each other. This axial movement is normally resisted by a spring or a series of spring disks indicated at 230 and which tend to expand against an inturned flange 232 on the shell 190 at one end and against the bushing flange 234 and portions of bearings 228 at the other end. The spring members 230 are sufficiently strong so that the parts are normally maintained in the relative longitudinal positions shown in Fig. 3 with the flange 232 and shell 190 pushed all the way to the right relative to the rod 188 and bushing 226. The parts will be maintained in this position as the threaded nut 194 is turned to tighten the grip by movement of the threaded shaft 192 and rod 188 to the left in Fig. 3. When the movable grip member 186 encounters some resistance, however, as for example when it grasps the desired tool or load which is to be operated, further axial movement of the grip 186 and rod 188 to the left is resisted. Up to this point the rod 188, the internal rod 222, the transformer core 218, the threaded shaft 192, and the transformer body 210 have all moved axially as a unit during the tightening of the grip, with the core 218 in its central or neutral position within transformer 210.

If, however, additional rotation is applied to the nut 194 after the member 186 encounters resistance, the threaded shaft 192 will continue to move to the left, carrying with it the transformer body 210 and the shell 190 of the connection. Since further movement of the grip 186 and rod 188 are resisted by the member which is grasped, the parts associated with the threaded shaft will move relative to the rod member 188, and the spring members 230 will gradually be compressed. If a light grip or tension between the member 186 and member 184 and intervening load is desired, the relative movement of the threaded shaft 192 can be discontinued after only slight compression of the spring members 230. If, however, a very tight grip is desired, further movement of the threaded shaft 192 will be required to compress the spring members 230 more fully. During the relative movement of these parts and the compression of the spring members 230, there will be relative movement between the internal rod 222 and transformer core 218 with respect to the threaded shaft portion 192 and transformer body 210. The change in coupling between the transformer core and its coils caused by this relative movement produces changes in the output of the secondary coil 214, which may be connected to actuate an indicating instrument such as 237 (Fig. 1). By virtue of this arrangement of the parts, the operator at the location of instrument 237 can determine how tightly the gripping members 186 and 184 are engaging a particular load or tool even though the gripping portions are not directly accessible for measurement or observation of this tension.

The bearing 228 and the interengaging parts 204 and 206 provide means for preventing relative rotation of the cooperating threaded members and change in the axial position of the grip member 186 during rotation of the wrist portion 162. The grip member 186, shaft 188, rod 222 and transformer core 218 will all rotate with the wrist 162. The interengagement of parts 204 and 206 on the threaded shaft 192 and forearm casing, however, will prevent rotation of shaft 192 and its associated parts. The transformer body 210, and connecting shell 190 will accordingly be held against rotation. Bearing 228 and springs 230 thus permit the shell 190 to remain stationary while shaft 188 rotates, but connect the parts for axial movement or change in applied force of the grip member whenever the threaded member 194 is operated.

The gripping members themselves are particularly designed for cooperation with a wide variety of tools and loads. Thus as shown in Figs. 3 and 6, the fixed gripping member 184 has a central surface 236 perpendicular to the path of movement of the grip portion 186 and inclined lower and upper portions 238 and 240, respectively, which provide lower and upper gripping sections projecting toward the movable grip portion. The lower gripping portion includes spaced inclined projections 242 and 244 separated by an intermediate notch 246 extending transversely of the path of movement of the movable grip 186.

The movable gripping member 186 includes a central gripping surface 248 parallel to surface 236 of the fixed grip, and lower and upper inclined gripping surfaces 250 and 252 projecting toward the fixed grip portion. The lower gripping surface is in the form of a single projection 254 designed for insertion in the notch 246 of the stationary gripping member when the grip members are substantially collapsed with respect to each other. The use of the spaced inclined gripping portions 142 and 244 on the stationary member 184 in combination with the single gripping projection 254 on the movable member 186, makes it possible to grasp and retain circular objects such as the washer 256 illustrated in dotted outline in Fig. 6. At the same time, the six surfaces 236, 238, 240, 248, 250, and 252 are designed for the grasping of octagonally shaped members which may serve as the shanks of suitable tools or accessories as described later in this application.

In order that the material handling apparatus described above may be controlled by an operator located at a point spaced from the machine, suitable remote control mechanism is provided. This control equipment includes in this case a pair of spaced control handles 258 and 260 (Fig. 1). Control handle 258, for example, includes suitable mechanism, such as the linear differential transformer 262, which may be connected through cables 264 and amplifiers (not shown, but see circuit diagram described below) and cables 266 to certain of the operating motors described above. For example, cable 266 may include separate control cables indicated schematically in Fig. 1 as follows. One control cable 268 is indicated as connected to the bridge motor 40. A second control cable 270 is connected to the carriage motor 60, while the third cable 272 of this group is connected to the vertical lift motor 120. Thus by movement of the control handle 258 left and right or forward and back, the carriage and bridge motors may be energized to move the mechanism horizontally left and right or forward and back to the desired point in space. By rocking the handle 258 on a horizontal axis the vertical lift motor may be suitably controlled to raise and lower the pantograph mechanism and shoulder. The details of the control mechanism and the circuit connections by which these operations are accomplished are readily understandable to persons skilled in the electrical engineering art and are described further below.

Similarly, the control handle 260 is mounted for relative movement in various directions to be described and these movements of the control handle 260 are transformed into electrical impulses which by means of cable 273, suitable amplifiers, and the electrical connections designated generally at 274 serve to control the remaining motors of the device. Thus cable 274 may include one branch 276 connected to the horizontal rotation motor 70 for rotation of the shoulder 94 and pantograph unit in either direction. The remainder of the cable, indicated at 278, passes down through the pantograph mechanism and is connected to the upper arm motor 130, the forearm motor 160, the wrist rotation motor 170, and the grip motor 200.

Further details of the control handle 260 and the connections by which this operation is accomplished will now be described with reference to Figs. 7 through 15.

The control handle 260 and its associated parts are shown in detail in Figs. 7 through 14, inclusive. The general wiring arrangement by which these parts are connected to the operating motors of the device is shown schematically in the block diagram of Fig. 15.

Figure 12:
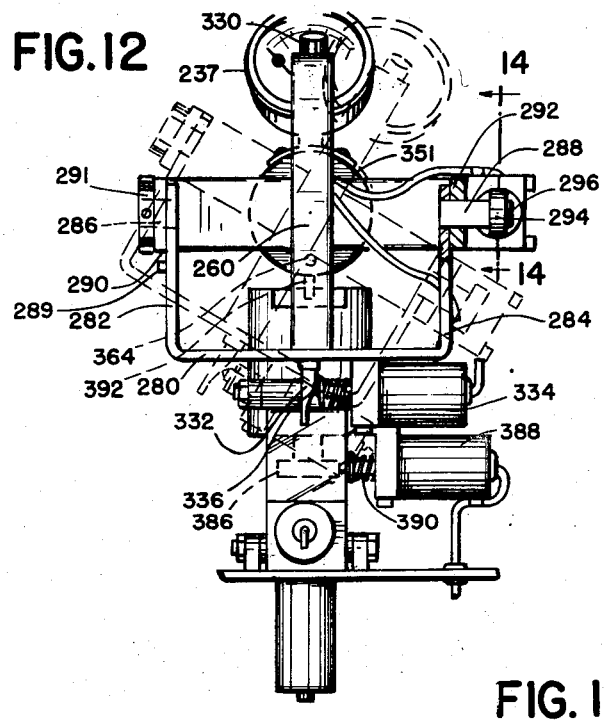
Fig. 12 is a view of the device of Fig. 7 looking from right to left in Fig. 7 to illustrate another of the controlling movements of the unit.
Figure 13:
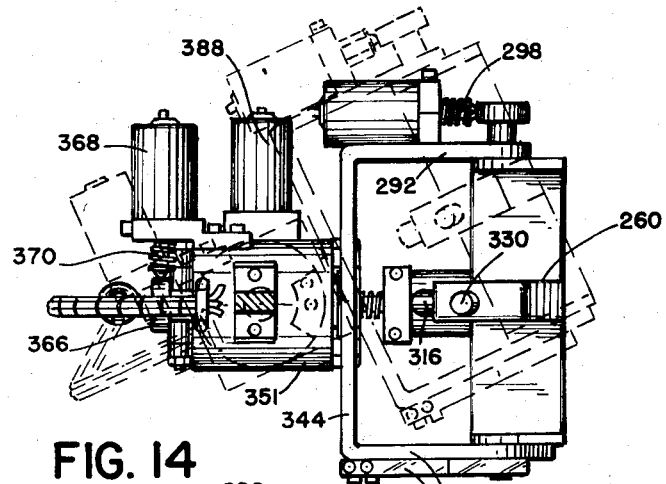
Fig. 13 is a top view of the device of Figs. 7 through 12.

As shown in Figs. 7 and 12, the control handle 260 extends substantially vertically upward from a horizontal cross member 280 which constitutes the lower part of a yoke having upwardly projecting arms 282 and 284. Shafts 286 and 288 at the upper ends of the respective arms 282 and 284 are pivoted in side plates 290 and 292 for rotation of the handle and yoke parts on a horizontal axis passing through the center of the shafts 286, 288. A limiting stop pin 289 on handle yoke 282 is provided for engagement with the undersurface of the side plate 290 to limit the maximum rotary displacement of the control handle 260 around the axis of shafts 286 and 288. This rocking movement is illustrated in Fig. 7 where the solid line position shows the normal or neutral position of the handle while the dotted line position shows the position in which the handle is moved to operate the forearm upwardly.

To achieve this control of the forearm movement, the shaft portion 288 carries a cam 294 which controls a linear differential transformer 296 similar to that described above in connection wtih the grip tension indicator. This transformer is illustrated in detail in Fig. 14 in which it is apparent that transformer 296 has an axially movable core portion 298. An extension 300 of this core is urged by springs 302 outwardly against the periphery of the control cam 294. The control cam is shown in the central or neutral position in which the core extension 300 engages a point 304 on the periphery of the cam which maintains the core 298 centered with respect to the transformer coils. Clockwise rotation of shaft 288 in Fig. 14 would bring a smaller portion of the cam indicated at 306 opposite the core extension 300 and would permit the core 298 to move to the left in the figure.

Figure 14:
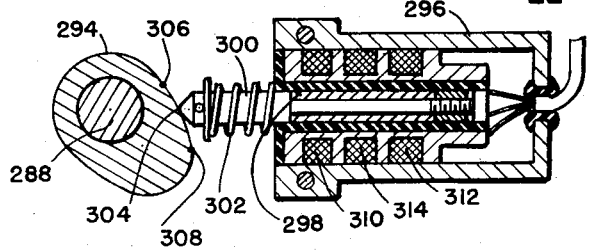
Fig. 14 is an enlarged sectional view on the line 14—14 of Fig. 12.
Figure 15:
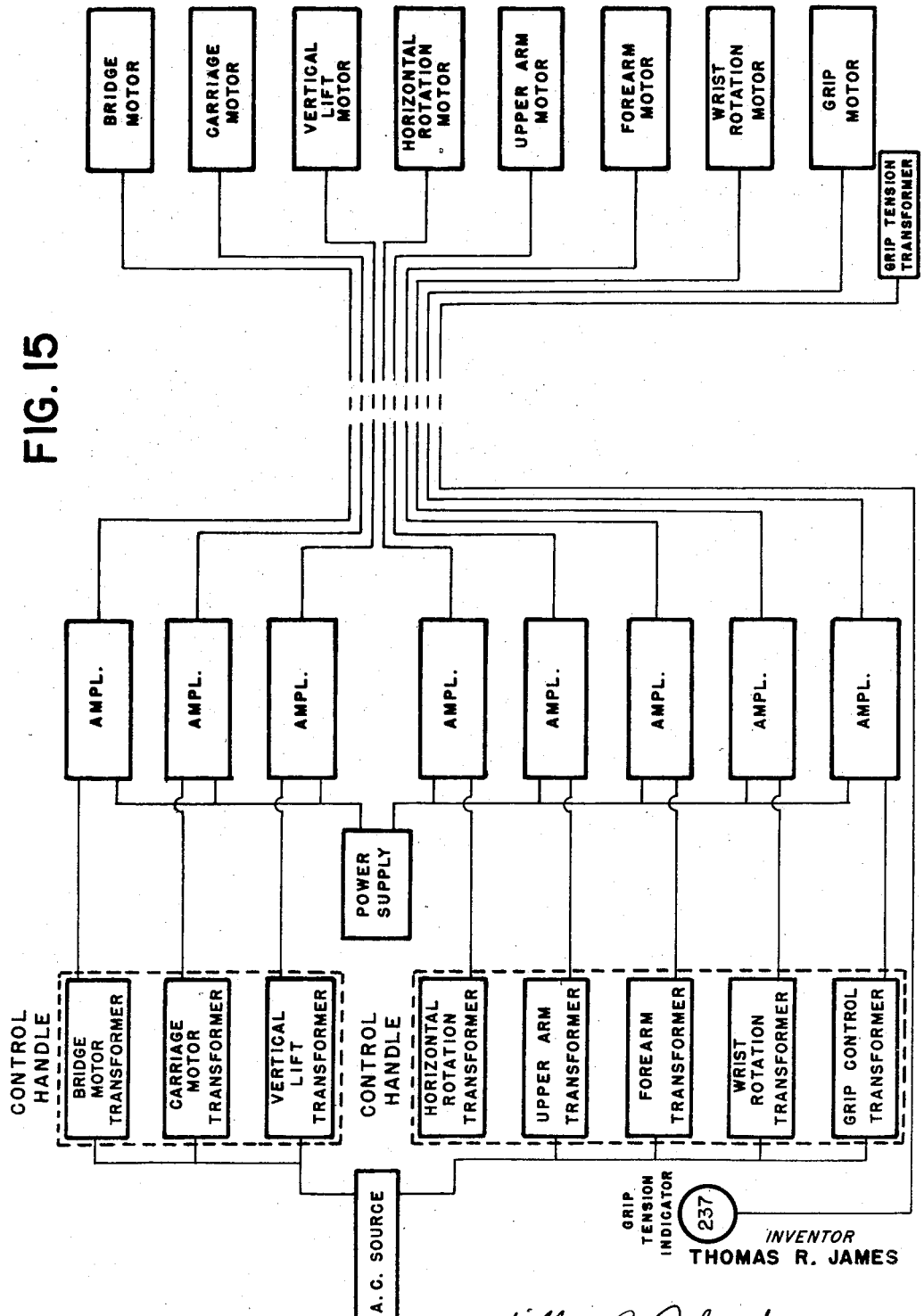
Fig. 15 is a schematic circuit diagram of the unit of Figs. 1 through 14.

Similarly, rotation of the handle and shaft 288 in a counter-clockwise direction in Fig. 14 would move the larger cam portion 308 against the core extension 300 and would force the core 298 to the right against the action of spring 302. The transformer includes primary coils 310 and 312 and an intermediate secondary coil 314 as described above and operates in a manner similar to that discussed in connection with the grip tension indicator. Thus the coils are connected in such a way that when the core 298 is centered in the neutral position, the output of the secondary coil 314 is at a minimum.

Displacement of the core 298 to the left gradually increases the output of the secondary coil 314 in one predetermined phase, while movement of the core 298 in the opposite direction from the neutral position will gradually increase the output of the secondary coil 314 but with an opposite or different phase. This difference in phase can be used to control the direction of rotation of the forearm motor in known manner, particularly where a two-phase motor is utilized.

At the same time the extent of the relative displacement of the core 298 will determine the amplitude of the output from the secondary coil and this amplitude will control in turn, through a suitable amplifier the actual energization or speed of the motor. Such a circuit arrangement will be readily understood by persons skilled in the electrical engineering art and is shown schematically in the block diagram of Fig. 15. In this diagram it will be noted that the forearm transformer is shown in the dotted block representing one of the control handles and that the output of this forearm transformer, after suitable amplification, controls the direction and speed of operation of the forearm motor. Accordingly, the forearm 142 may be raised or lowered as the handle 260 is rocked clockwise or counter-clockwise from the heavy-line position as viewed in Fig. 7, the axis of such rocking or rotation being the axis of the horizontal shaft portions 286 and 288.

To normally maintain the handle 260 in the heavy line or normal position of Fig. 7 and to return it to that position whenever it is displaced therefrom and subsequently released, the shaft portion 286 is provided with a square cam member 291 engaged by flat springs 293 on the side plate 290. Thus rotary displacement of handle 260 in either direction from the heavy line position of Fig. 7 will rotate the square portion 291 and separate the spring leaves 293. The tendency of these leaves to restore themselves to their original position will rotate the square section 291, shaft 286, and handle 260 back to the normal or rest position whenever the handle is released by the operator. Thus movement of the forearm will stop at any time that the control handle is released, and the arm will remain in its operated position until the control handle is again displaced.

To control the grip motor, the control handle 260 is provided with a grip-tensioning button 316 on the forward end of a substantially horizontal shaft 317 sliding in a groove or recess 318 in the handle 260. Member 317 is provided with rack teeth 320 which mesh with the teeth of a pinion 322 mounted for rotation on a cross shaft 324. The teeth of this pinion 322 also mesh with a vertically extending rack portion 326 on the grip control shaft 328. This shaft 328 is slidable vertically in the handle 260 and carries an enlarged projecting grip-release button 330 at its upper end.

At the opposite end or lowered end 332 of the member 328, means are provided for controlling another linear differential transformer 334. This controlling means is shown in Fig. 12 as the inclined cam surface 336. The vertically slidable member 328 is provided with a central collar 338 engaged by upper and lower springs 340 and 342, respectively. These springs normally balance each other and tend to maintain the member 328 in a neutral position. If the grip-tensioning button 316 is squeezed, the member 317 will be moved to the right in Fig. 7 and through the interconnection of its rack 320, pinion 322, and the rack portion 326 on member 328, the latter member will be moved upwardly, thereby permitting the core transformer 334 to move to the left in Fig. 12. When the grip-tensioning member 316 is released, the spring 340, which will have been compressed during the upward movement, will expand and restore the member 328 to the neutral position in which the transformer 334 will have its minimum or zero output.

Similarly, if the grip-release button 330 is depressed, the shaft 328 will move downwardly and the cam portion 336 will force the core of the transformer 334 to the right in Fig. 12. Upon release of the member 330 the spring 342 which will have been compressed during such movement will again restore the portion 328 and the cam 336 and transformer 334 to their neutral positions. By connection of the transformer 334, referred to as the grip-control transformer, in substantially the same manner as the forearm transformer described above, it is apparent that the grip motor can be controlled so that the squeezing of the tensioning button 316 will cause the grip to move toward closed position, while depression of the grip-release button 330 will cause the motor to move the grip member toward open position. If neither button 316 nor button 330 is pressed, the control member 328 will remain in the neutral position and the grip member will remain stationary in the position to which it has previously been moved. The closing and releasing movement of the grip may be fast or slow depending upon whether the buttons 316 and 330 are moved slightly from their normal position or a substantially greater distance. The greater the displacement, the greater the output of the transformer 334 and the greater the speed thereby imparted to the grip motor through the general network shown in Fig. 15.

In order to provide means on the control member 260 for controlling the wrist rotation of the handling unit described above, the side plates 290 and 292 to which the grip portion is pivoted are formed as part of a frame or first supporting member which includes a transverse portion 344 formed integrally with the plates 290 and 292.

Extending from the cross member 344 is a shaft 346, the axis of which passes through the axis of the cross shafts 286 and 288 and substantially perpendicular thereto. This shaft 346 is supported in suitable bearings 348 and 350 in a movable head or second supporting member 351. Because of the particular orientation of the shaft 346 and these bearings, rotation of the frame members 290, 292, and 344 around the axis of shaft 346 will be achieved by a wrist movement of the operator when the latter is grasping the handle 260. Thus the controlling movement of the handle 260 will closely simulate the movement of the wrist portion of the machine itself.

Within the movable head 351 suitable rollers 352 are mounted on a cross shaft 354 as shown in Figs. 7 and 8. This cross shaft 354 may be in the form of a bolt or securing member which mounts the rollers 352 on an intermediate collar 356. The collar 356 is keyed to shaft 346 for rotation therewith, but movable axially of the shaft by virtue of slot 357. A spring 358 normally urges the rollers 352 to the left in Fig. 7 against the cam surface 360 of an end plate 362 on a movable head 351. The cam surface 360 has diametrically opposed low points in which the rollers 352 are shown at rest in Fig. 7. On rotation of the handle 260 around the axis of shaft 346, the rollers 352 will ride to the right by virtue of slot 357 as the handle 260 is rotated in either direction from its normal position of rest. Because of the action of spring 358, this displacement will be resisted, and the spring will tend to force the rollers 352 to seek the lowest or left-hand point of the cam surface 360 and thus restore the shaft 346 and handle 260 to the neutral position shown in Fig. 7. This neutral position of the wrist control portion of the mechanism is also shown in heavy lines in Fig. 12, with one of the operating positions of the wrist-controlling portion shown in dotted outline in that figure.

A limiting stop 364 is provided for engagement with the undersurface of the cross frame portion 344 to limit the maximum rotary displacement of the control handle 260 and shaft 346.

The actual controlling device by which the movement of this handle 260 is converted into suitable operation of the wrist rotation motor includes a cam 366 on the end of shaft 346. This cam controls a linear differential transformer 368 of the type discussed above through engagement of the core 370 of such transformer (Fig. 13) with the cam 366.

To control the operation of the horizontal rotation motor, the movable head 351 is provided with a vertically depending shaft 372 which is rotatably mounted in bearings 374 and 376 in a third or lower control head supporting member 378. Just as in the case of the wrist rotation control, this shaft 372 is provided with return rollers 380 mounted on a frame which is keyed to the shaft 372 for rotation but which is slidable axially thereof by a pin and slot or keyed slot connection. Spring 382 normally urges the rollers downwardly in Fig. 7 against the upper cam surface of an end plate 384 substantially similar to end plate 362.

When parts are in the normal or neutral position of Fig. 7 (also shown in the heavy line position of Fig. 13) the rollers 380 will be at the lowest point of the specified cam surface. Displacement of the control handle 260 around the axis of rotation of shaft 372 in either direction, as for example to the dotted line position of Fig. 13, will not only rotate shaft 372 but will thus cause rollers 280 to ride on to a higher portion of the cam and tend to restore the parts to the normal position of Fig. 7 as a result of the force of spring 382.

This horizontal rotation of the control handle 260 is converted into the necessary energization of the horizontal rotation motor by means of a cam 386 on the lower end of shaft 372 and a linear differential transformer 388. The core 390 (Fig. 12) of this transformer 388 engages cam 386 and is held against it by a spring with the transformer core in neutral position as previously described when the operating member 260 is in its normal position.

Displacement of the handle by horizontal rotation around shaft 372 in either direction thus causes displacement of the core of transformer 388 one way or the other to increase the output of the transformer secondary with a phase which is characteristic of the particular direction of movement. By circuit connections similar to those described, the horizontal rotation motor is thus energized for movement in the appropriate direction (i. e., the same direction as that in which the control unit is rotated) and at a speed dependent upon the extent of displacement of the control handle 260 from its neutral position.

For control of the raising and lowering movement of the upper arm through the upper arm motor, the lower control head supporting member 378 is mounted for displacement toward and/or away from the normal position of an operator grasping the handle 260. Thus the lower control body portion 378 is provided with bearing projections 392 and 394 which carry parallel cross shafts 396 and 398, respectively, preferably in the form of bolt members. Supporting legs 400 and 402 have their upper ends rotatably connected to these cross shafts 396 and 398, respectively. The lower end of supporting leg 400 is rotatably mounted on a cross shaft 404 parallel to shaft 396.

This supporting leg 400 is also provided with a horizontal base portion 406 which is integrally connected to the supporting leg 400 and extends toward the opposite leg 402. As shown particularly in Fig. 9, this horizontal portion 406 has a narrow central projection 408 which rests on the upper end 410 of a plunger shaft 412 mounted for vertical movement in a housing portion 413 on the base 415 of the control unit. A spring 414 normally urges the plunger 412 upwardly and thus by engagement between the head 410 and the narrow central projection 408 tends to rock the supporting leg 400 to the left.

Similarly, the supporting leg 402 is pivotally mounted on a cross shaft or bolt 416 in the base parallel to shafts 396, 398, and 404. This leg 402 is also provided with a horizontal base portion 418 which extends toward the opposite leg 400. This horizontal portion 418 has spaced projections 420 extending on either side of the central projection 408 on the horizontal base portion 406 of leg 400. These projections 420 also engage the head 410 of the vertically movable plunger 412 and the operation of spring 414 tends to rock the leg 402 to the right.

Because of the stop collar or shoulder on the head 410 which engages the undersurface of control housing 415, the upward movement of plunger head 410 is limited to a point at which the portions 408 and 420 will lie in the same plane and the legs 400 and 402 will consequently be substantially vertical. If the operator now pulls the control handle 260 from the normal or heavy line position of Fig. 10 toward the right in that figure, the legs 400 and 402 will be rocked to the right and thus displaced from their normal vertical positions. During this rocking movement, the horizontal leg 406 will move downwardly and its central projection 408 will depress the plunger head 410 against the action of spring 414. The other horizontal leg 418 will move upwardly and will have no effect.

Spring 414 will thus tend to restore the horizontal portion 406 to its heavy line position in Fig. 10 and will restore the control handle 260 and associated parts to the normal heavy line position of this figure once the handle is released. The handle 260 may also be pushed to the left, i. e., in the opposite direction from its normal heavy line position. Stops 419 limit the downward movement of horizontal leg portions 406 and 418 to determine the maximum displacement of the control handle toward or away from the operator.

This push and pull movement of the control handle 260 is converted into suitable operation of the upper arm motor to raise or lower the upper arm, i. e., to swing it forwardly or back, by another linear differential transformer 424, the core 422 of which is spring-urged against the vertical leg portion 402. Thus displacement of the leg 402 in either direction from its normal vertical position will result in displacement of the core 422 one way or the other and will result in suitable energization of the upper arm motor by the circuits indicated schematically in Fig. 15 and described in connection with the other motors and controls above.

As already noted, the upper movable head 351 of the control member supports an indicating instrument 237 by which the amount of tension of the grip member may be registered to the operator.

*Figs. 16 through 23*

A modified construction for accomplishment of the purposes of the present invention is shown in Figs. 16 through 23. In this case the apparatus includes a movable trolley or carriage 426 which is supported by toothed wheels 428 driven by shafts 430 for movement of the carriage 426 back and forth on the tracks 432 of a travelling bridge (not shown) similar to the travelling bridge of the first embodiment. The details of the mechanism by which the bridge is moved in one direction and the trolley or carriage 426 is reciprocated on the bridge in a horizontal direction at right angles to the direction of movement of the bridge may be substantially the same as in the first embodiment and are not here repeated or shown.

To support the controlling mechanism, the trolley 426 is provided with transverse frame members 434 which support a collar 436 as shown in detail in Fig. 17. The collar 436 has a series of guide rollers 438, in this case four of them, such rollers being supported in shafts 440 carried by inwardly projecting arms 442 of the collar.

In this case, the control mechanism is carried by a vertically movable post or tube 446 which is supported by the rollers 438 and collar 436 for vertical movement. This post 446 is provided with flattened areas extending vertically of the post as indicated at 448, for cooperation with the rollers 438. These flattened areas both assist in guiding the vertical movement of the device and prevent relative rotation of the post 446 in the collar 436.

In order to provide a firm support for the vertically movable post 446 to resist displacement of the post from its vertical axis, a second supporting collar 450 is provided at a point spaced vertically above the collar 436. This collar 450 is carried by frame members 452 connected to the trolley 426. Collar 450 includes additional rollers 454 engaging the flattened vertical strips 448 of the post 446. Thus a relatively strong support for the vertically movable post 446 is provided on the trolley 426, this support permitting vertical reciprocation of the post but preventing relative rotation of the post on its own axis and resisting horizontal displacement of the various portions of the post.

To provide the desired vertical movement of the post 446 a toothed rack 456 is secured to one side of the post. The teeth of this rack 456 are engaged by a driving pinion 458 on an intermediate shaft 460 (Fig. 16) carried by suitable frame members on the trolley 426. An intermediate gear 462 engages the pinion 458 and is carried by an auxiliary shaft 464. This intermediate gear 462 in turn is driven by a worm 466 on the shaft 468 of vertical lift motor 470. The vertical lift motor may be connected and controlled in the manner described in connection with the previous embodiment.

At the lower end of the vertically movable post 446 is an enlarged housing or shoulder member 472 which is rigidly fixed to the post. This upper shoulder member 472 includes a transversely extending top plate 474, an integral cylindrical body portion 475, and a bearing support 476 at its lower end, this support being annular and coaxial with the post 446. Rotatably supported on this bottom collar 476 by means of a bearing 478 is an annular member 480 secured to a large gear 482. This gear is rigidly secured in turn to the top of a lower shoulder member 484 which is thus rotatable with respect to the upper shoulder member 472, such rotation being on the vertical axis of the post 446.

The desired rotation of the lower shoulder member 484 in a horizontal arc is obtained by means of a driving pinion 486 which engages the large gear 482. This pinion 486 is carried on the lower end of a vertically extending shaft 488 supported in bearings 490 on the upper shoulder portion 472. The upper portion of this shaft 488 is suitably squared or splined as at 492 for vertically sliding engagement within the hub 494 of a gear 496 supported in bearings 498 in one of the frame members of the trolley 426. Thus the non-circular shaft portion 493, which extends vertically parallel to the post 446, is free to reciprocate vertically in the gear 496 as the post 446 is raised and lowered by operation of the vertical lift motor 470. Because of the non-circular cross section of the shaft 492, however, this shaft will at all times be in driven engagement with gear 496 so that rotation of the gear will drive the pinion 486 and cause rotation of the lower shoulder member 484 and gear 482 through the desired horizontal arc.

Gear 496 in turn is driven by a horizontal rotation motor 500 which has a driving pinion 502 at one end of the motor shaft 504. This driving gear 502 engages a gear 506 on intermediate shaft 508. A gear 510 also mounted on shaft 508 in turn engages the gear 496 and thus provides a driving connection from the horizontal rotation motor 500. It will be understood that motor 500 and its associated gearing are all mounted rigidly with respect to the carriage 426, the details of the connection being omitted from Fig. 16 for clearness. The manner in which the horizontal rotation motor 500 is controlled to obtain the desired rotation of shoulder member 484 may be substantially similar to or equivalent to the circuit connections described previously.

As shown in Figs. 18 and 19, the shoulder member 484 includes spaced depending side frame members 512 and 514 which are hollow and include spaced walls. A transversely extending shaft 516 mounted in these depending side frame members 512 and 514 provides an axis of rotation for the upper arm member indicated generally at 518. This upper arm member includes spaced side plates 520 and 522 which are inwardly offset at their upper ends as shown at 524 and 526. The upper ends of these side plates are connected to spaced supporting members 528 and 530.

Member 528 is mounted upon and keyed at 532 to a hub portion 534 which is rotatable with respect to shaft 516 and is in turn rotatably supported in the frame member 512 by bearings 554. Also keyed to the hub portion 534 at 536 is another gear 538 engaged and driven by an intermediate gear 540 on transverse shaft 542. Another intermediate gear 544 on auxiliary shaft 546 engages the gear 540. Shaft 546 carries a worm gear 548 which is driven by the upper arm motor 550 through a worm 552 on the motor shaft.

The other bearing member 530 at the upper end of the upper arm is rotatably mounted on the shaft 516 as shown in Fig. 19. By virtue of the gearing just described, operation of the upper arm motor 550 will result in rotation of gear 538 and the associated upper arm members 520 and 522 with respect to the axis of shaft 516. Movement of these parts, however, is independent of the movement of shaft 516 since the parts are freely rotatable on the shaft.

One end of shaft 516 is rotatable within the hub portion 534 which, as already pointed out, is supported in bearings 554 in frame member 512. The other end of shaft 516 is rotatably supported in suitable bearings 556 in the frame member 514. The purpose of the independent rotatable mounting for the shaft 516 is to provide a driving or controlling means for the operation of the lower arm member or forearm described below.

This forearm is indicated generally at 562 and is mounted at the lower end 558 of the upper arm 518 by means of a cross shaft 560. Details of the connection are shown particularly in Fig. 20 which shows the cross shaft 560 in the form of a bolt member. The forearm 562 at its upper end is provided with projecting plates 564 and 566 connected to a hub portion 568 on gear member 570. Plate 564 is keyed to the hub of gear 570 at 572, while plate 566 is keyed to the opposite end of hub 568 at 574.

The hub portion 568 in turn is mounted for rotation on the axis of shaft 560 by means of suitable bearings 576 and 578 in the respective side plates 520 and 522 of the upper arm 518. The axis of shaft 560 is horizontal and is parallel to the axis of shaft 516 by which the upper arm member is connected to the shoulder member. The driving chain 580 connects the driving gear 570 of the forearm member to a gear 582 (Fig. 19) which is keyed to upper arm shaft 516. Thus rotation of the shaft 516 in the shoulder member 484 will rotate gear 582 and, by means of chain 580, will also drive gear 570 to cause rotation of the forearm member 562 around the axis of shaft 560.

The desired rotation of shaft 516 for this purpose is obtained by a gear 586 keyed at 584 to the end of shaft 516 which is opposite from the hub portion 534 and its associated driving connections for the upper arm. Gear 586 in turn is driven by an intermediate gear 588 on a cross shaft 590 in side member 514. A worm gear 592 meshes with the intermediate gear 588 to drive the same and is carried by a shaft 594 (Fig. 18) likewise mounted in the shoulder member. A worm 596 engages the worm gear 592 to provide the desired driving connection, worm 596 being located on the shaft 598 of forearm motor 600. This motor may be controlled through an operating handle in the manner described above in connection with the previous embodiment of the invention. Thus the operation of forearm motor 600 will result in transmission through the gearing and chain connections described, of the desired movement to the forearm member 562, while the upper arm 518 remains stationary until upper arm motor 550 is independently energized.

As shown in Figs. 21, 22, and 23, the forearm member 562 includes a casing portion 602 in which the driving mechanism for the wrist rotation and grip tension operations are located. A wrist member 604 is mounted in the forearm portion and extends longitudinally therefrom. This wrist member 604 is mounted within a barrel or collar member 708 which is rotatably mounted in the casing 602 in bearings 608. A collar 606 fits around barrel 708 between these bearings. For convenience in the substitution of other accessories, the wrist member 604 may be removable from this barrel member 708 and is keyed to it at 610 for rotation with the collar, by means of a splined or other suitable connection. The rotatable wrist supporting portion 708 is integrally connected to a gear 612, coaxial therewith. This gear 612 is driven by a pinion 614 on an intermediate shaft 616 supported in bearings 618 in casing 602.

In connection with the description of the driving connections for these parts, Fig. 22 may be regarded as the accurate or controlling figure, while Fig. 21 has been expanded with some of the members enlarged or spaced apart for convenience in understanding the driving connections.

A gear 620, which is also keyed to shaft 616, is driven by a pinion 622 on power shaft 624. This shaft 624 extends longitudinally of the casing and near the upper end of the casing carries a gear 626 which is keyed to the shaft. A driving pinion 628 engages the gear 626, gear 628 being keyed to a shaft 630 which also carries one member 632 of a magnetic clutch or brake of known type. This clutch includes a movable brake member 634 engaging the conical drum 632 when the brake member 636 is in one condition of operation. In its other condition of operation, the brake member 634 is withdrawn from the disk 632 to permit rotation of the shaft 630 and pinion 628.

Shaft 630 in turn is driven by a flexible power shaft 638 connected to the wrist rotation motor 640. In this case, the wrist rotation motor 640 is mounted on the upper arm member. Thus the weight of the parts associated with the forearm is substantially reduced, while the flexible shaft 638 provides a power connection from the wrist rotation motor to the gearing, just described, at all times. The magnetic brake 636 may be connected in circuit with the motor 640 in known manner so that the brake 630 is withdrawn from the disk 632 whenever the motor is energized. Conversely, when the energization of motor 640 is terminated by release of the corresponding control member, the brake member 634 will again engage the portion 632 to stop rotation of the shaft 630 immediately and thus prevent any overtravel of the gear train through which the wrist rotation is achieved.

The wrist rotation motor is controlled in the manner previously described and upon operation of the motor 640 in one direction or the other, the wrist 604 will be rotated by means of the connections including pinion 628, gear 626, shaft 624, gears 622 and 620, shaft 616, and gears 614 and 612.

The outer end of casing 602 is provided with a gasket or sealing member 708 to exclude dust and undesired particles from the internal mechanism of the forearm and wrist.

At the outer end of the wrist member 604 a grip, indicated generally at 642, is provided. This grip is substantially similar to the one previously described and includes a fixed gripping portion 644 and an axially or longitudinally movable gripping portion 646. This movable grip portion 646 is controlled by a rod 648 extending back through the wrist member 604 and coaxial therewith. The upper or inner end of this grip control rod 648 is threaded for a substantial length as indicated at 650. This threaded portion 650 is received within an internally threaded nut 652 which is rotatably supported coaxially with shaft 650 by means of bearings 654 and 656. A gear 658 is keyed to the nut portion 652 and the complete assembly is both rotatable and axially slidable within the bearings 654 and 656.

A spring member 660, which may consist of a series of spring disks, is interposed between the gear portion 658 and the bearing 656 and normally urges gear 660 and nut 652 to the left as viewed in Fig. 22. Fig. 22 shows the parts in their extreme right-hand position, while Fig. 21 shows the spring washers in expanded condition with the nut in its normal left-hand position.

With the spring member 660 in the expanded position of Fig. 21, rotation of the nut 652 and gear 658 in one direction will cause movement of the threaded shaft 650 to open the grip, while rotation of the parts in the opposite position will cause closing movement of the grip portion 646 toward the fixed grip portion 644. As the parts 646 and 644 approach each other, with some sort of object or accessory between them, a point will be reached at which further movement of part 646 is resisted by its engagement with the object or accessory. Continued rotation of the gear 658 and nut 652 beyond this point can produce no further relative axial movement of part 646. Therefore the gear and nut move from the position of Fig. 21 toward the right-hand position of Fig. 22, compressing the spring members 660. Thus the extent of compression of spring 660 determines the actual tension with which the grip members 644 and 646 engage each other or a particular intervening object. The extent of this displacement and relative grip tension may be indicated by the potentiometer circuit described below or by other suitable devices.

To produce the desired relative rotation of gear 658 and nut 652 a driving pinion 662 engages the gear. This driving pinion 662 is keyed to or integrally connected with a beveled gear 664 which serves as one member of a simple epicyclic train. Gears 662 and 664 are freely rotatable as a unit on the intremediate or auxiliary shaft 616. Keyed to this shaft is a hub member 668 carrying two or more radially projecting shafts on which intermediate epicyclic beveled gears 666 are rotatably supported. Gears 666 mesh with the beveled gear 664.

Another beveled gear member 672 is also rotatably and coaxially mounted on the shaft 616 and meshes with the intermediate beveled gears 666. Keyed to or integrally connected with the beveled gear 672 is a gear 674 driven by gear 676 which is freely rotatable on the power shaft 624 described above. Gear 676 is connected by a sleeve portion or hub 678 to a driven gear 680 which is operatively engaged by a driving pinion 682. Gears 676 and 680 and hub 678 are all freely rotatable on shaft 624.

Pinion 682 is located on the end of a fixed shaft portion 684 mounted in bearings 686 in the casing 602. The fixed shaft 684 is connected to one end of a flexible power shaft 688 which in turn is operatively connected to the grip tension motor 690. This motor is also mounted in the upper arm member 518 so that the weight of the motor is carried at a point remote from the forearm casing in which the grip-tensioning mechanism is located. The flexible connection 688, like the flexible shaft 638, provides a means for location of the corresponding motors farther from the load without interference with the free movement of the forearm 562 on its pivot 560.

Operation of the grip tension motor 690 will accordingly cause rotation of the gear 658 and nut 652 by the train of gearing including pinion 682, gear 680, hub portion 678, gear 676 (the last three elements being rotatably mounted on shaft 624) and thence to gear 674 and beveled gear 672 which are freely rotatable on shaft 616. If this shaft 616 is at rest, which is its normal condition when the grip tension member is being operated, the hub portion 668 will be fixed in position or stationary with shaft 624. Rotation of the beveled gear 672 will accordingly cause rotation of the intermediate beveled gears 666 and through them will produce rotation of beveled gear 664 and pinion 662 in the opposite direction from that in which beveled gear 672 is rotating. From pinion 662 the gear 658 and nut 656 are driven as described above.

The introduction of the epicyclic train including gears 664, 666, and 672 and the fixed hub portion 668 keyed to shaft 616, is particularly designed to provide for maintenance of the adjusted position of the grip member 646 during rotation of the wrist member 604. For example, in the absence of such an epicyclic train, gear 658 would remain stationary while the wrist portion 604 was rotated. Since relative rotation between the grip 646 and its shaft 648, on the one hand, and the wrist portion 604, on the other hand, is not permitted by the particular form of construction, rotation of the wrist member 604 would result in rotation of the threaded shaft portion 650. With gear 658 and nut 652 held stationary, the threaded shaft 650 and its associated grip member 646 would thus move axially with respect to the fixed grip portion 644 during such wrist rotation.

By the arrangement of the present embodiment of the invention, however, it will be noted that operation of the wrist rotation motor results in rotation of the intermediate gears 614 and 620 which are keyed to shaft 616. Thus shaft 616 rotates and with it must rotate the central hub portion 668 of the epicyclic train.

Because the grip tension motor is at rest (and because its gear train may be provided with a brake member similar to the brake 634 described above in connection with the wrist rotation system), the beveled gear 672 will remain stationary. Rotation of shaft 616 and hub 668 will accordingly result in rotation of the intermediate beveled gears 666 on their own axes as these gears revolve with shaft 616 around the axis of fixed gear 672. The rotation of the intermediate beveled gears 666 will thus cause rotation of the beveled gear 664 and its associated pinion 662 in the same direction as the direction of rotation of shaft 616. The gear 658 and nut 652 will accordingly rotate whenever the wrist member 604 and its associated driving gearing is operated.

By appropriate choice of the relative sizes of the gears and the number of teeth in each the rotation of nut 652 will be at the same rate and in the same direction as the rotation of the threaded shaft portion 650 which moves with the wrist member 604. By virtue of this arrangement the threaded shaft portion 650 and its associated grip member 646 will remain in the same relative axial position with respect to fixed grip member 644 as the position occupied by the parts prior to such wrist rotation. Thus independent adjustment and operation of the grip tension and wrist rotation controls can be achieved, just as in the device of Figs. 1 to 15.

As mentioned above, the grip tension gear train includes provision for measurement of the displacement of the gear 658 and nut 652 to indicate the relative compression or expansion of spring 660 and the corresponding tension of the grip. One way in which the desired indication can be obtained is by a potentiometer arrangement in which one end 692 of a pivoted lever 694 engages the face of gear member 658 or a portion of nut 652. Lever 694 is pivoted at 696 as shown in Fig. 21 and includes at its opposite end a movable potentiometer arm 704. A contact point on this arm engages the coil 700 of a potentiometer circuit, the pointer or contact member 702 being insulated from the end 704 of the lever arm by suitable insulation.

A suitable spring or resilient member (omitted from the drawing for clearness) constantly urges end 692 of lever 694 against the gear member 658 so that the position of the potentiometer contact 702 is determined by the axial location of the gear. Displacement of the gear from the normal position of Fig. 21 toward the extreme position of Fig. 22 will thus change the relative location of contact point 702 on the potentiometer coil 700 to include a larger portion of the coil in the indicating circuit. The potentiometer terminals 700 and 702 may be suitably connected to an indicating instrument such as that described in connection with the previous embodiment of the invention.

The embodiment illustrated and described in connection with Figs. 16 through 23 thus constitutes a material handling unit which is readily adaptable to remote control operation and which provides a variety of movements simulating the actual movements of a human shoulder, upper arm, forearm, wrist, and grip.

Figs. 24 and 25 illustrate further details of the forearm and wrist mechanism of the device shown in Figs. 16 through 23, with the standard wrist member replaced by a wrench unit. This wrench includes in general a body portion which can be rotated in the same manner as the regular wrist member described above, in combination with a rotating wrench located at the outer end of the accessory and having its axis of rotation transversely of the axis of the wrist and forearm. This rotatable wrench is driven by a central or internal rod or shaft which engages cross notches or other recesses 706 in the outer end of the rotatable nut 652. Nut 652 thus has internal threads for axial driving engagement with the regular grip unit, and rotary driving means for engagement with other accessory units.

To provide for the removal of the regular wrist member and the insertion of such an accessory, the annular cylindrical sleeve or barrel member 708 of the forearm and wrist mechanism is provided with a retaining member or ball 710 urged inwardly by a spring 712 against the edges of an opening 714 in the internal sleeve 606. The size of opening 714 is slightly less than the diameter of the ball 710 so that it provides a positive stop for the inward movement of the ball. The inner portion of the ball engages in an annular recess or channel 716 in the removable body member 718 of the accessory. A similar channel (not shown) is provided in the standard wrist member 604 of Figs. 21 and 22.

The hollow cylindrical body portion 718 of the accessory is provided at its inner end with splines or keyways 720 for engagement with the keys 610 of the rotatable barrel 708 which is an integral part of gear 612.

The hollow cylindrical body member 718 is provided with internal bearings 722 adjacent the end of casing 602. An outer body portion 724 extends axially beyond the casing 602 and carries an internal shaft 726 rotatably mounted in the bearings 722. This shaft 726 passes back through the hollow body 718 and is provided with a head 728 at the inner end. Head 728 is formed with driving projections 730 which engage the cross slots 706 of the nut 652. The connections at 706 and 730 thus make it possible to rotate shaft 726 by operation of the control which normally energizes the grip tensioning motor. At the same time the splined connections at 720 and 610 make it possible to rotate the body portions 718 and 724 in a manner similar to the motion of wrist member 604 in the embodiment discussed above.

The outer end of shaft 726 is provided with a worm 732 which engages a worm gear 734 mounted for rotation on an axis extending transversely of the axis of shaft 726 and spaced slightly away therefrom. Gear 734 is formed as an integral portion of the wrench body 736 having a squared or non-circular opening 738 extending therethrough axially of the gear. This wrench member 736 is journaled for rotation in the outer end of body portion 724. The construction of the device shown in Figs. 24 and 25 is accordingly such that operation of the wrist rotation control will cause rotation of the body portion 724 to position the wrench 736 in any desired angular plane around the axis of the forearm. Once the wrench is in position and in engagement with the desired nut or bolt, operation of the grip tensioning control described above will result in tightening or loosening of the nut through rotation of the member 652 and its driving engagement with shaft 726 and worm 732. A convenient accessory is thus provided which not only facilitates engagement of the wrench portion with nuts in various angular positions, but also provides for continuous rotation of the wrench through 360° or more as needed by a particular application.

In Figs. 26 and 27 an accessory is illustrated which may serve as the shaft or body portion of a socket wrench set, a screw driver set, or other devices of similar type. This accessory includes a main body portion 740 in the form of an enlarged rod, with a squared or non-circular driving extension 742 at its outer end. The inner end of the shaft 740 is provided with a head portion 744 through which an opening 746 of particular configuration extends. This opening 746 has an enlarged portion 748 near the end of head 744 nearest to shaft 740. The opening 746 is narrowed at its opposite end as indicated at 750, the total width of opening 746 at this point being just sufficient to accommodate the movable portion 646 of the grip member illustrated in Fig. 21.

At this narrowed end of the opening 746, the head 744 has a substantially flat vertical surface, i. e., a surface perpendicular to the axis of shaft portion 740, which is offset slightly from the small end of opening 746 toward the wider end and is connected to the upper and lower faces of the head 744 by inclined surfaces 754 and 755. These inclined surfaces 754 and 755 and the vertical surface 752 are shaped to correspond to the internal surfaces of the movable grip member 646 as illustrated in Fig. 27.

Similarly the innermost end of head 744 is provided with a flat vertical surface 756 connected to the top and bottom faces of the head 744 by inclined portions 758 and 760. The vertical portion 752 thus fits the straight vertical surface 762 of the fixed jaw member 644, while the bottom inclined surface 760 fits the inclined portion 764 of the fixed grip member and the upper inclined surface 758 fits the inclined portion 766 of the grip member.

Because of the particular configuration of the head 744 of this accessory, it is possible for the grip members 644 and 646 to engage the head portion 744 and pick up the unit 740 without assistance from an operator. Thus the movable grip member 646 is originally spaced suitably away from the fixed grip 644 and its pointed lower end is inserted downwardly in the opening 746. Once the grip member and head 744 are in the proper axial alignment, the grip 646 is closed toward the grip portion 644. The various vertical and inclined surfaces described above are gradually brought into tight interfitting engagement with each other to hold the member 740 rigidly in position as an axial extension of the wrist portion 604. It is thus possible to operate any desired socket wrench or other accessories which may be adapted for connection on the non-circular end portion 742.

In Figs. 28 and 29, a device is illustrated which provides the equivalent of a pair of pliers. This attachment includes a main body portion 768 provided with a head 770 substantially similar to the head 744 just described. Thus head 770 has an opening 772 which is enlarged at one end and narrow at the other. The narrow portion 774 is designed to accommodate the width of the movable grip portion 646 as shown in Fig. 28.

At its outer end, the body portion 768 carries an offset extension 776 which includes a reversely offset portion 778 provided with teeth to serve as one fixed jaw for the device. Cooperating with the fixed jaw 778 is a movable jaw 780 which is pivoted at 782 to the extension 776. Jaw 780 includes a lateral extension or lever arm 784 formed as an integral part of the unit. This lever arm 784 extends transversely of the axis of body portion 760 and is provided with a cross slot 786 for accommodation of the driving portion 788 of an axially movable control shaft 790. This shaft 790 is axially movable within the hollow central body portion 792 of the member 768. A spring 794 engages a stop collar 796 on shaft 790 within the collar bore 792. The opposite end of spring 794 engages the end wall 798 of bore 792 and thus urges the shaft 790 toward the right in Fig. 28 or outwardly of the attachment away from the grip member to which it is to be attached.

To manipulate the shaft 790 axially and thus provide for lateral gripping or releasing action of the movable jaw 780, the inner end of shaft 790 is connected to a rectangular ring 800. This rectangular ring moves in a slot between the upper and lower portions 802 and 804, respectively, of head 770. In this respect, the head differs from that described in connection with Figs. 26 and 27.

As shown in Fig. 29, the upper head portion 802 includes an integral cross member 806 provided with inclined gripping surfaces, while the lower portion of the head at 804 includes an integral transverse gripping portion 808 which is also provided with inclined faces. The driving ring 800 of the shaft 790 has an integral transverse portion 810 designed to engage the vertical central face of the movable jaw 646 when the parts are in the position of Fig. 29.

With the device just described, the spring 794 normally urges shaft 790 and ring portion 810 to the right from the gripping or closed position of Figs. 28 and 29. When the movable grip member 646 is inserted through the opening 772 and also inside the ring 800, the grip portion 646 is then tightened against the fixed grip 644. Engagement of the beveled gripping surfaces previously described with the upper and lower transverse portions 806 and 808 will hold the head 802 and body portion 768 firmly in position through the added cooperation of the cross member 810 which is spring-urged toward the right in Figs. 28 and 29. The strength of spring 794 is sufficiently great so that cross member 810 in effect constitutes a firm surface against which the movable grip member 646 engages to maintain the desired rigidity of the parts even when the movable jaw member 780 is permitted to remain open. Operation of the movable grip member 646 toward the fixed member 644 to the extreme position shown in Figs. 28 and 29 will then close the jaw 780 toward jaw 778. At the same time, the approaching movement of the grip members 646 and 644 will provide a stronger and stronger interlocking engagement with the head portions 806 and 808 so that the plier attachment can handle substantial loads, particularly when the jaws are fully closed. Here again, the particular configuration of the opening 772 and the relative arrangement of the upper and lower head portions 806 and 808 and the transverse ring portion 810 on shaft 790 make it possible to operate the material-handling unit so that the grip members originally engage and pick up the accessory 768 and then move the accessory to the desired object, tighten the grip, and manipulate the object as desired.

The device shown schematically in Fig. 30 represents an alternate construction by which any one or more of the controlling movements described above in connection with Figs. 7 to 14 may be translated into appropriate operation of the particular motor. In this case the control handle 812 is illustrated as extending substantially vertically from the horizontal base member 814. This base member is integrally connected to side members 816 and 818 from which axially aligned supporting shafts 820 and 822 project outwardly. The axis of shafts 820 and 822 is thus substantially horizontal. Shaft 820 is supported in a side plate or frame member 824 similar to the side plate 290 of Fig. 13. Shaft 822 is rotatably supported in a second side plate 826 substantially similar to the side plate 292 of Fig. 13.

The particular alternate control mechanism to be described will thus relate to the operation of the forearm motor and it will constitute an alternate embodiment which can be substituted for the cam 294 and linear differential transformer 296 or for any of the other cam and differential transformer controls previously described.

In this case, the outer end of shaft 820 is provided with a square cam 828 which engages an insulating portion 830 on a spring blade 832 biased downwardly against the cam. In the neutral position of Fig. 30, the flat side of cam 828 permits downward displacement of the spring arm 832 to its lowest possible point under the influence of its own resilience.

Rotation of the handle 812 with respect to the axis of the shafts 820 and 822 in either direction will cause one of the corners or high points of the cam 828 to engage the insulating block 830 and raise the spring arm 832 upwardly. In response to slight upward movement of this type, the contact point 834 on spring blade 832 will engage a cooperating contact 836 on a second spring blade member 838.

The contact arm 838 is connected by an insulating block 840 to another contact arm 842. Further angular rotation or displacement of the handle 812 around the axis of shafts 820 and 822 will cause the corner of cam 828 to raise the insulating block 830 still farther and thus to raise contact arms 838 and 842 upwardly. As a result of this additional displacement, the contact 844 on arm 842 will engage the cooperating contact 846 on contact arm 848.

For convenience, the respective contact arms may be mounted by means of intermediate insulating blocks 850 on a bracket member 852 attached at 854 to the side plate 824. The construction shown provides in effect two switches which are operated sequentially in response to increasing angular displacement of the handle 812 in either direction from its neutral position with respect to the axis of shafts 820 and 822. The respective switch blades are connected by suitable wiring such as 856 and 858 to a phase-shift network of a type familiar to those in the electrical engineering profession. Such a phase-shifting network is used to control a thyratron amplifier in known manner and thus provide a step-by-step increase in the operating speed of the corresponding motor.

If desired, additional switches could be provided in order to achieve additional motor speeds besides the low speed and high speed which the two switches illustrated make possible. In the event that an infinite number of different motor speeds is desired, i. e., a continuous and gradual change of speed in response to increasing angular displacement of the handle 812, a potentiometer may be substituted for the two switches illustrated, the potentiometer forming a part of the phase-shift network in known manner.

To control the direction of motor rotation in accordance with the appropriate direction of angular displacement of the handle 812, the shaft 822 is provided at its outer end with a cam 860. This cam has a low portion 862, 876 extending around substantially half of its circumference and a raised or high portion 864 at one side.

Engaging the upper surface of cam 860 is a spring control arm 866. A similar spring control arm 868 engages the lower surface of the cam. The two spring arms 866 and 868 are supported by insulating blocks 870 on a bracket member 872 secured at 874 to the side plate 826. In the neutral position illustrated in Fig. 30, it will be seen that the lower portion 862 of the cam extends all the way around from the lower blade 868 to the upper blade 866 to include the portion 876 on the side of the cam opposite the projection 864. Rotation of the handle 812 around the axis of shaft 822 in one direction will cause the high point of the cam 864 to move downwardly and engage the lower blade 868 to move it in a downward direction. During such movement the position of the upper blade 866 will remain unchanged.

Similarly, angular displacement of handle 812 in the opposite direction will cause the high portion 864 of cam 860 to engage and raise the spring arm 866, while the low portion of the cam at 876 would maintain the lower contact arm 866 in its neutral position without change.

The upper spring arm 866 engages the insulated control button 878 of a switch unit 880 mounted on a bracket 882 connected to side plate 826. Preferably, switch 880 is of the type requiring relatively small displacement of the control button 878 for operation of the switch. Similarly, spring arm 868 engages the control button 884 of a second switch unit 886 mounted on a bracket 888 attached to side plate 826. Thus angular displacement of the handle 812 in one direction will operate switch 880 while switch 886 remains in its original condition. Similarly, operation of the handle 812 in the opposite angular direction will cause operation of the switch 886, without affecting the oirginal or neutral position of switch 880.

Switch 880 is connected by suitable wiring 890, while switch 886 is connected by wiring 892, to the reversing relays of the motor as shown in the schematic diagram. Such connections are well understood by persons skilled in the electrical engineering art and provide a means by which the particular direction of operation of the motor may be controlled in response to the particular direction of angular displacement of the handle 812. Thus when the handle 812 is angularly displaced in one direction, the switch 880 will be operated and the motor will be energized for operation in one direction. Angular displacement of handle 812 in the opposite direction will engage the other switch 886 and, by means of the reversing relays, will cause operation of the motor in the opposite direction.

Thus a control unit is provided in which suitable cams and switches associated with a movable handle control the direction of operation of the motor in response to the relative direction of displacement of the handle, while at the same time the speed of the motor is controlled according to the extent of the relative displacement which takes place. Thus the operator can conveniently manipulate the handle 812 and obtain the desired operation of the particular material-handling motor, without the necessity of stopping to determine which direction of motor operation is desired and without the necessity of separate adjustment of a speed-controlling member. If the operator wishes to start the motor at a slow speed, a small displacement of handle 812 will suffice. Should higher speed operation be desired, a greater angular displacement of the handle can be made.

According to the foregoing description, various embodiments of a material-handling unit have been provided which accomplish the objects set forth at the beginning of the application and which provide for the handling of remote operations of widely different types with a maximum of efficiency and simplicity.

Since minor variations and changes in the exact details of construction will be apparent to persons skilled in this field, it is intended that this invention shall cover all such changes and modifications as fall within the spirit and scope of the attached claims.

Now, therefore, I claim:

1. A remote control manipulator comprising an overhead crane, a rigid shaft suspended from said crane, guide means holding said shaft in a vertical position while it moves along its longitudinal axis, power means to raise and lower said shaft, a rotatable mounting attached to the lower end of said shaft and rotatable around said longitudinal axis, a gripper coupled to the mounting and adapted to rotate about an axis of its own which extends transversely relative to said longitudinal axis, and means for actuating and controlling the movements of said elements separately.

2. A material handling unit comprising a supporting arm, a wrist member mounted on the arm for relative rotation around a predetermined axis of the arm, said wrist member having a movable grip member mounted thereon for relative movement parallel to said axis between closed and open positions, means preventing relative rotation of said grip member with respect to said wrist member around said axis, first driving means on the arm operatively connected to the wrist member for rotating the wrist and grip members as a unit around said axis, the grip member and arm member having cooperating threaded members, the first of which is mounted on the arm for rotation on said axis and the second of which is fixed to the grip member and extends along said axis, second driving means on the arm operatively connected to the first cooperating threaded member for rotation of the latter to move the second threaded member and grip member along said axis independently of rotation of the wrist member, and means operatively connecting the first driving means and first threaded member for rotation of the latter at the same speed as the wrist member whenever the latter is rotated, thereby preventing undesired movement of the grip member along said axis during rotation of the wrist member.

3. A material handling unit according to claim 2 in which one of said driving means includes a shaft and the other driving means includes an epicyclic train having spaced gears loosely rotatable on the shaft, a hub keyed to the shaft between the spaced gears, and at least one epicyclic gear freely rotatably mounted on the hub on an axis at right angles to the shaft and interconnecting said spaced gears.

4. A material handling unit comprising a supporting arm, a wrist member mounted on the arm for relative rotation around a predetermined axis of the arm, said wrist member having a movable grip member mounted thereon for relative movement parallel to said axis between closed and open positions, means preventing relative rotation of said grip member with respect to said wrist member around said axis, first driving means on the arm operatively connected to the wrist member for rotating the wrist and grip members as a unit around said axis, the grip member and arm member having cooperating threaded members, the first of which is rotatably mounted on one of said grip and arm members for rotation on said axis and the second of which is mounted on the other of said grip and arm members, second driving means on the arm operatively connected to said first cooperating threaded member for rotation of the latter to move the grip member along said axis independently of rotation of the wrist member, and means preventing relative rotation of the first and second threaded members with respect to each other during rotation of the wrist member.

5. A material handling unit according to claim 4 in which the second threaded member is mounted for axial movement, but keyed against rotation, with respect to said one of said grip and arm members on which the first threaded member is rotatably mounted, said second threaded member being mounted for relative rotation around said axis, but secured against relative axial movement, with respect to said other of said grip and arm members.

6. A material handling unit according to claim 4 in which the first threaded member consists of a nut rotatably mounted in the arm member while the second threaded member consists of a threaded shaft extending along said axis and secured to the grip member for axial movement therewith but freely rotatable on said axis with respect to the grip member, the threaded shaft having means preventing rotation on said axis with respect to said arm member thereby preventing relative rotation of the threaded shaft and nut and axial movement of the grip during rotation of said wrist and grip members by said first driving means.

7. A material handling unit according to claim 6 in which the threaded shaft and the grip member have interengaging portions providing limited relative axial movement of the shaft and grip member between first and second relative positions, and resilient means normally urging the grip member axially of the shaft toward a gripping position but permitting relative axial displacement of the threaded shaft against the action of said resilient means and thereby gradually increasing the force with which the grip member engages a particular object in response to continued rotation of the nut after the grip member has first engaged such object.

8. A material handling unit according to claim 7 having indicating means actuated in response to relative axial displacement of the threaded shaft with respect to the grip member against the action of said resilient means, after the grip member engages a particular object, the indicating means thereby showing the force with which the grip member is engaging the object.

9. A material handling unit according to claim 8 in which the indicating means includes a transformer having a coil and a movable core, one of which is rigidly connected with respect to the threaded shaft, and the other of which is rigidly connected with respect to the grip.

10. A material handling unit according to claim 4 in which said means preventing relative rotation of the first and second threaded members during rotation of the wrist member includes a shaft connected to one of said first and second driving means and rotatable during operation of said one driving means, the other of said driving means including an epicyclic train having spaced driving and driven gears loosely rotatable coaxially of the shaft, a hub fixed to the shaft between the spaced gears, and at least one gear freely rotatably mounted on the hub and interconnecting said spaced gears.

11. A material handling unit according to claim 4 in which one of said first and second threaded members is mounted for limited axial movement between first and second axially spaced positions with respect to one of said arm and grip members, said unit also having resilient means normally urging said one threaded member axially to its first position, said one threaded member being urged axially toward its second position against the action of said resilient means (thereby increasing the force with which the grip member is held in closed position against a particular object) in response to further relative rotation of said first and second threaded members after the grip member has engaged such object.

12. A material handling unit according to claim 11 having indicating means actuated in response to the amount of relative axial displacement of said one threaded member and thereby showing the relative force with which the grip member engages the particular object.

13. A material handling unit comprising a first supporting member, a second supporting member pivoted to said first member for relative rotation on a first predetermined axis, a working member mounted on the second member for rotation on a second axis substantially perpendicular to said first axis, the second member having a fixed grip portion, a movable grip portion mounted on the second member for translation parallel to said second axis and keyed against relative rotation on said axis with respect to the second member, said movable grip portion and said second supporting member having cooperating threaded members, one of which is rotatably mounted on the second supporting member coaxially with said second axis and the other of which is fixed to the movable grip portion, first motor means mounted on the first member and operatively connected to the threaded member which is rotatably mounted on the second member for driving the movable grip portion, second motor means, driving means operatively connecting the second motor means and second supporting member for rotating the latter around said second axis, and means operatively connecting said driving means and the rotatably mounted threaded member and rotating the latter upon rotation of said second supporting member and thereby preventing relative translation of said grip members along the second axis during rotation of the second supporting member.

14. A material handling unit comprising a track, a traveling bridge supported for movement horizontally back and forth along the track, a trolley mounted on the bridge for movement horizontally back and forth along the bridge in a direction at right angles to the track, a first shoulder member, means supporting the first shoulder member from the trolley for movement along a vertical axis toward and away from the trolley, a second shoulder member mounted on the first shoulder for rotary movement on a vertical axis, an upper supporting arm pivoted to the second shoulder for rotary movement on a first horizontal axis, a lower supporting arm pivoted to the upper arm for rotary movement on a second horizontal axis parallel to said first axis, a wrist member mounted on the lower arm for rotary movement around a longitudinal axis substantially perpendicular to said second horizontal axis, a fixed grip member on the wrist member, and a movable grip member mounted on the wrist for movement along said longitudinal axis toward and away from the fixed grip, and separate motor means operatively connected to said members thereby controlling each of said movements.

15. A material handling unit according to claim 14 in combination with a remote control unit electrically connected to said motor means, the control unit including a pair of control handles each of which is mounted for movement along at least three different paths from a neutral position, one of said control handles being connected to the motor means controlling the horizontal movements of the bridge and trolley and the vertical movements of the upper shoulder, and the other of said control handles being connected to the motor means controlling the rotary movement of the lower shoulder member and the movements of the upper arm, lower arm, wrist and grip members.

16. A material handling unit having a load supporting arm with a longitudinally extending axis, a wrist-supporting barrel mounted on the arm for rotation around said axis, means in the barrel for rotary driving engagement with a wrist member, means for removably securing such wrist member within the barrel, first driving means on the arm operatively connected for rotation of the barrel, an internally threaded nut mounted for independent rotation coaxially with said barrel and axially spaced therefrom, and second driving means operatively connected for rotation of the nut, the internal threads of the nut being adapted for removable engagement with a threaded axially movable shaft carried by one type of wrist member for movement of such shaft axially of the wrist member, and the nut also having driving means for rotary driving engagement with a coaxially extending rotatable shaft carried by another type of wrist member for rotation of the shaft independently of rotation of such wrist member.

17. A material handling unit according to claim 16 in combination with an accessory having a wrist portion removably mounted in the barrel for rotation coaxially therewith, a shaft mounted in the wrist portion for independent coaxial rotation and engaging the driving means on said nut, a wrench socket mounted on the outer end of said wrist portion for rotation on an axis angularly disposed with respect to the axis of said wrist portion, barrel and shaft, and gear means interconnecting the shaft and wrench socket for rotation of the latter in response to rotation of the nut and shaft.

18. A material handling unit having a load supporting arm provided with a gripping portion consisting of a relatively fixed first grip member and a second grip member movable along a predetermined path toward and away from the fixed grip member, each of the grip members having parallel central faces in a plane perpendicular to said path and upper and lower faces inclined from said central surface toward the other grip member, the inclined upper and lower faces of one of said grip members being recessed for insertion of the inclined upper and lower faces of the other grip member thereby providing for movement of the movable grip member toward the fixed grip member until said parallel central faces engage each other.

19. A material handling unit according to claim 18 in which the fixed grip member has a central slot extending along said path and dividing at least the upper and lower faces of the fixed grip member into two portions spaced transversely of the path, and the movable grip member has its upper and lower faces narrower than the slot for insertion of said faces within the slot as the central faces of the gripping members approach each other.

20. A remote control manipulator comprising an overhead crane, a support member suspended from said crane and mounted for movement up and down a vertical axis and for rotation around said axis with respect to said crane, a gripper mounted at the lower end of the member, said gripper having cooperating grip members at least one of which is relatively movable to and from the other between gripping and releasing positions, said gripper being mounted for rotation about an axis of its own extending through the space between the gripping members, said gripper also being relatively movable with respect to said support member to a position in which the axis of rotation of the gripper is out of line with said vertical axis.

21. A remote control manipulator according to claim 20 in which said gripper is mounted on the support member for swinging movement on an axis extending transversely of both said vertical axis and said axis of rotation of the gripper.

22. A remote control manipulator according to claim 20 having means for independently actuating and controlling the separate movements and rotations of said elements, said controlling means being located at a point spaced from said crane and free of rigid mechanical attachment to said crane for movement of the crane, support member and gripper without substantial change in location of the controlling means.

23. A remote control manipulator comprising an overhead mount, a support member suspended from said overhead mount and mounted for movement up and down a vertical axis and for rotation around said axis with respect to said overhead mount, a gripper mounted at the lower end of the member, said gripper having cooperating grip members at least one of which is relatively movable to and from the other between gripping and releasing positions, said gripper being mounted for rotation about an axis of its own extending through the space between the gripping members, said gripper also being relatively movable with respect to said support member to a position in which the axis of rotation of the gripper is out of line with said vertical axis.

24. A remote control manipulator according to claim 23 having means for independently actuating and controlling the separate movements and rotations of said elements, said controlling means being located at a distance from said manipulator and being free from mechanical connection therewith.

25. A remote control manipulator comprising an overhead crane, a support member suspended from said crane and mounted for movement up and down a vertical axis and for rotation around said axis with respect to said crane, a gripper coupled to the lower end of the member, said gripper being adapted to swing on an axis which extends transversely of said vertical axis and also adapted to rotate about an axis of its own which is angularly disposed with respect to said swinging axis, and means for actuating and controlling the movements of said elements separately.

26. A material handling unit comprising a supporting arm, a wrist member mounted on the arm for relative rotation about a predetermined axis of the arm, a movable grip member connected to the wrist and having an element with relative movement parallel to said axis between open and closed grip positions, means preventing relative rotation of said grip member with respect to said wrist member around said axis, first driving means on the arm operatively connected to the wrist member for rotating the wrist and grip members as a unit about said axis, the grip member and arm member having cooperating grip operating members the first being rotatably mounted on the arm and the second being connected to said grip element, second driving means on the arm operatively connected to said first grip operating member to move said grip element along said axis independently of rotation of the wrist member, and means preventing operation of the grip operating members due to rotation of the wrist member.

27. A material handling unit comprising a supporting arm, a wrist member mounted on the arm for relative rotation around a predetermined axis of the arm, said wrist member having a movable grip member mounted thereon with a grip element having relative movement parallel to said axis between closed and open positions of the grip member, means preventing relative rotation of said grip member with respect to said wrist member around said axis, first driving means on the arm operatively connected to the wrist member for rotating the wrist and grip members as a unit around said axis, grip operating members cooperatively mounted on the grip and arm, the member on the grip being connected to said element having movement along said axis, second driving means on the arm connected to the grip operating member on the arm for operation of the grip operating members to move said grip between open and closed positions independently of the rotation of the wrist member, the connection between said grip element and the grip operating member on the grip permitting rotation of the grip and wrist relative to the arm without changing the position of said grip element so that the grip will remain in position irrespective of rotation of the wrist.

28. A remote control manipulator comprising an overhead mount including a first carriage linearly movable in a horizontal plane, a second carriage supporting said mount and carriage and also movable in a horizontal linear path at right angles to the first carriage, separate power means for relatively operating either of said carriages, a supporting shoulder carried on the overhead mount for vertical linear movement and provided with power means for such movement, an upper arm connected at one end to the shoulder by a vertical and a horizontal pivotal axis and provided with power means to separately cause such pivotal movements, a lower arm connected to the other end of the upper arm by a horizontal pivotal axis and provided with power means to cause such pivotal movement, a wrist connected to the lower arm by a rotational axis extending at right angles to the axis of connection between the lower and upper arm and provided with power means to rotate the wrist, a grip carried on the wrist with a connection to prevent relative rotation between the wrist and grip, said grip having jaws and provided with power means to move the jaws between gripping and releasing positions, and a control unit electrically connected to each of said power means and adapted to operate the power means individually or in selective combination with others.

29. A remote control manipulator comprising a shoulder carried on an overhead mount for vertical linear reciprocation, an upper arm connected at one end to the shoulder by a vertical and a horizontal pivotal axis, a lower arm connected to the other end of the upper arm by a horizontal pivotal axis, a wrist connected to the lower arm by a rotational axis extending transversely to the axis of connection between the upper and lower arms, a grip carried on the wrist with a connection to prevent relative rotation therebetween, a reciprocating element carried by the grip and operative irrespective of the rotation of the wrist to move the grip between gripping and releasing positions, individual electrical power means for moving each of the elements with respect to their connected elements, and remote control means having an electrical cable as a sole connection to the electrical power means and operating said individual power means either individually or in selective combination with others.

30. A remote control manipulator comprising a shoulder carried on a suitable mount for vertical reciprocation to adjust its position, an upper arm pivoted at one end on a horizontal axis to the shoulder to pivot in a vertical plane, means positioned between said upper arm and mount to permit rotation of the upper arm about a vertical axis, a lower arm pivotally connected to the other end of the upper arm by a horizontal axis to pivot in a vertical plane, a wrist connected to the lower arm by a rotational axis extending at right angles to the pivotal axis of the lower arm, a grip mounted on the wrist and having gripping jaws movable between gripping and non-gripping position, means preventing relative rotation of the grip with respect to the wrist, means carried on the lower arm for operating the grip between its operative positions, and a connection between the grip operating means and the grip permitting relative rotation therebetween with rotation of the wrist and grip.

31. In a material handling unit comprising vertically extending support means mounted for rotation about a vertical axis, first motor means for causing rotation of said support means in either direction, a first arm pivotally connected at one end to the lower end of said support means for movement up and down in a vertical plane, second motor means for causing pivotal movement of said arm, a second arm pivotally connected to the other end of said first arm for up and down movement in a vertical plane, third motor means for causing pivotal movement of said second arm, a wrist portion rotably supported on its own axis by said second arm, adjustable work holding means on said wrist portion rotatable therewith, fourth motor means for causing said rotation of the wrist portion about its own axis, fifth motor means for adjusting said work holding means, and a control unit remote from the handling unit, the improvement comprising a handle for the control unit, support structure mounting the handle for movement from a neutral position in a plurality of directions including first means mounting the handle for pivotal movement in a horizontal plane to operate said motor means in either direction, second means mounting the handle for substantial reciprocable movement in a back and forth direction to operate said second motor means in either direction, third means mounting said handle for pivotal movement in one vertical plane to operate said third motor means in either direction, fourth means mounting said handle for pivotal movement in a vertical plane perpendicular to said one vertical plane to operate said fourth motor means in either direction, finger actuable means carried by said handle to operate said fifth motor means, and electric control means constituting the sole connection between the control unit handle and said motor means, the control means including power supply means for the motor means controlled by said movement of the handle, the direction of handle displacement from neutral position determining the particular motor means to be energized and the direction in which such motor means operates the work holding member, and the extent of displacement of the handle from its neutral position determining the power supply output and motor speed.

32. In combination, a material handling unit comprising a carriage movable in a longitudinal path, a trolley movable on said carriage in a path transverse thereto, vertically movable means depending from said trolley, respective motor means for moving said carriage, trolley and vertically movable means, a first arm pivotally connected to said vertically movable means for pivotal movement in a vertical plane, a second arm pivotally connected to the first arm for pivotal movement in a vertical plane, a wrist portion supported by said second arm for rotation about its own axis, adjustable work holding means carried by said wrist portion and rotatable therewith, respective motor means for moving said first and second arms, said wrist portion and said adjustable work holding means, a first remotely positioned operating means for controlling said respective motor means and moving said carriage, trolley and vertically movable means, and a second remotely positioned operating means for controlling said respective motor means for moving said first and second arms, said wrist portion and said adjustable work holding means.

33. A manipulator adapted to be operated and controlled by a controller located at a remote point, comprising in combination a support, a plurality of elements corresponding to a shoulder, upper arm, lower arm, hand and fingers suspended from said support, means for pivotally connecting said shoulder, upper arm and lower arm together, means adapted to engage said shoulder element for rotatably mounting said connected elements on the support for rotation as a unit about a vertical axis, independent means for rotating the upper arm and lower arm about their pivotal connections to move said upper arm and lower arm in a manner corresponding to the human arm, and additional means for rotating the connected elements as a unit about a vertical axis passing through the shoulder element thereof.

34. A manipulator adapted to be operated and controlled by a controller located at a remote point, comprising in combination a support, a plurality of elements corresponding to a shoulder, upper arm, lower arm, hand and fingers suspended from said support, means for pivotally connecting the upper arm to said shoulder about a transverse axis, means for pivotally connecting the lower arm to the upper arm about a transverse axis, means for connecting the hand to said lower arm for pivotal movement about the longitudinal axis of said hand, means adapted to engage said shoulder element for rotatably mounting said connected elements on the support for rotation as a unit about a vertical axis, independent means for rotating the upper arm, lower arm, and hand about their pivotal connections to move the connected elements in a manner corresponding to the human arm, and additional means for rotating the connected elements as a unit about a vertical axis passing through the shoulder element thereof.

35. A manipulator adapted to be operated and controlled by a controller located at a remote point, comprising in combination a support, a plurality of elements corresponding to a shoulder, upper arm, lower arm, hand and fingers suspended from said support, means for pivotally connecting said shoulder, upper arm, lower arm, and hand together, means adapted to engage said shoulder element for rotatably mounting said connecting elements on the support for rotation as a unit about a vertical axis, independent means for rotating the upper arm, lower arm, and hand about their pivotal connections to move the connected elements in a manner corresponding to the human arm, and additional means for rotating the connected elements as a unit about a vertical axis passing through the shoulder element thereof.

36. A system for performing operations at a remote point with a manipulator substantially duplicating the movements and operations of an upper limb of a remote operator, comprising in combination a support; a plurality of manipulator elements corresponding to a shoulder, arm and digitate hand; means for pivotally connecting said shoulder, arm and hand elements together in operative relationship, the arm element being pivotally connected at one end to the shoulder element to move about a transverse axis of said arm element and the hand element being pivotally connected at the other end of said arm element to move both about a transverse axis and also about the longitudinal axis of said hand element; means adapted to engage said shoulder element for rotatably mounting said connected elements on said support for rotation as a unit about a vertical axis; a track; means for mounting said support on said track for translation along it; motor means for rotating the arm and hand about their pivotal connections to move the connected elements in a manner corresponding to a human upper limb, for rotating the connected elements as a unit about a vertical axis passing through the shoulder element thereof, and for motivating the translation of the support on said track; handle means remote from said manipulator elements and adapted to be grasped by an operator; means supporting said handle means for movement from neutral; and control means connected between said handle means and said motor means, said control means including power supply means, means applying power selectively to each of said motor means in response to movement of said handle means to cause relative motion of manipulator elements in directions corresponding to the directions of displacement of said handle means from neutral, and means for controlling the speed of said motion in accordance with the magnitude of displacement of said handle means from neutral.

37. A remote control manipulator comprising an overhead crane, a support member suspended from said crane and mounted for movement up and down a vertical axis and for rotation around said axis with respect to said crane, a gripper coupled to the lower end of the member, said gripper being adapted to rotate about an axis of its own which is angularly disposed with respect to said vertical axis, means for actuating and controlling the movements of said elements separately, said support member being connected to said crane by a vertical pantograph frame, the frame having free arms extending vertically, and power means reciprocating in a horizontal direction and connected to one of said arms to raise or lower the frame, the other of said arms being fixed with respect to the reciprocating arm.

References Cited in the file of this patent

UNITED STATES PATENTS

| | | |
|---|---|---|
| 628,832 | Morgan et al. | July 11, 1899 |
| 655,533 | Wellman et al. | Aug. 7, 1900 |
| 1,463,090 | Nafziger | July 24, 1923 |
| 2,254,083 | Nickles et al. | Aug. 26, 1941 |